United States Patent [19]

Leonard et al.

[11] Patent Number: 4,914,694

[45] Date of Patent: Apr. 3, 1990

[54] MODIFYING A TELEVISION SIGNAL TO INHIBIT RECORDING/REPRODUCTION

[75] Inventors: Eugene Leonard, Sands Point; Bill Perlman, New York, both of N.Y.; Karoly Budai, Danbury, Conn.; William R. Dolson, New York, N.Y.

[73] Assignee: Eidak Corporation, Cambridge, Mass.

[21] Appl. No.: 180,369

[22] Filed: Apr. 11, 1988

[51] Int. Cl.[4] .............................................. H04N 7/167
[52] U.S. Cl. ......................................... 380/5; 380/14; 360/60
[58] Field of Search .................. 380/5, 11, 14; 360/60

[56] References Cited

U.S. PATENT DOCUMENTS

| | | |
|---|---|---|
| 3,963,865 | 6/1976 | Songer . |
| 4,024,575 | 5/1977 | Harney . |
| 4,100,575 | 7/1978 | Morio . |
| 4,163,253 | 7/1979 | Morio . |
| 4,340,906 | 7/1982 | den Toonder . |
| 4,390,898 | 6/1983 | Bond . |
| 4,447,828 | 5/1984 | den Toonder . |
| 4,454,543 | 6/1984 | Lund . |
| 4,488,176 | 12/1984 | Bond . |
| 4,527,195 | 7/1985 | Cheung . |
| 4,571,462 | 2/1986 | Hofstein . |
| 4,594,609 | 6/1986 | Romao et al. . |
| 4,631,603 | 12/1986 | Ryan . |
| 4,642,688 | 2/1987 | Lowry et al. .................. 380/11 |
| 4,673,981 | 6/1987 | Lippman . |
| 4,695,901 | 9/1987 | Ryan . |
| 4,736,420 | 4/1988 | Katznelson et al. ............. 380/14 |

Primary Examiner—Stephen C. Buczinski
Attorney, Agent, or Firm—Curtis, Morris & Safford

[57] ABSTRACT

A composite television signal is modified to inhibit the reproduction of an unauthorized recording thereof by conventional video recorders but enable the display of a video picture therefrom on a television receiver. The length of a frame (more particularly, the length of each field in a frame) is increased or decreased from standard length, either by changing the time duration of the respective horizontal line intervals included in each frame while keeping a constant, standard (e.g. 525) number of lines per frame, or by changing the number of horizontal line intervals which constitute a frame while maintaining the standard duration of each line interval (e.g. 63.5 microseconds). A profile pattern representing the variation of the video frame duration, or vertical period, (whether by changing the horizontal line durations or the number of lines in a frame) with respect to time is adjustable to correspondingly control the rate at which the vertical period (i.e. frame length) changes, the maximum and minimum vertical period and the ratio of increased to decreased vertical periods. Accordingly, substantially the same electronics responsive to the profile pattern may be used to modify the television signal; and the profile pattern itself may be changed easily, such as by simple software modifications, to accommodate different circumstances and to satisfy different conditions.

57 Claims, 14 Drawing Sheets

FIG. 4A
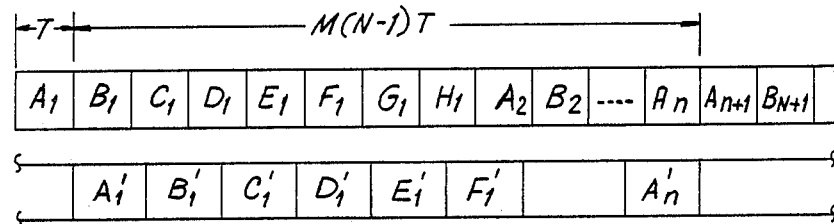
FIG. 4B
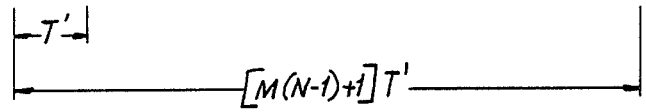
$$P = \frac{T}{T'} = \frac{MEMORY\ LOAD}{MEMORY\ UNLOAD}$$
$$N = \frac{P+1}{M(P-1)} - \frac{1}{P-1} = \begin{array}{l}\text{NO. OF LOAD/UNLOAD} \\ \text{MEMORY CYCLES UNTIL IT} \\ \text{IS TIME TO DROP (OR ADD)} \\ \text{A FRAME}\end{array}$$
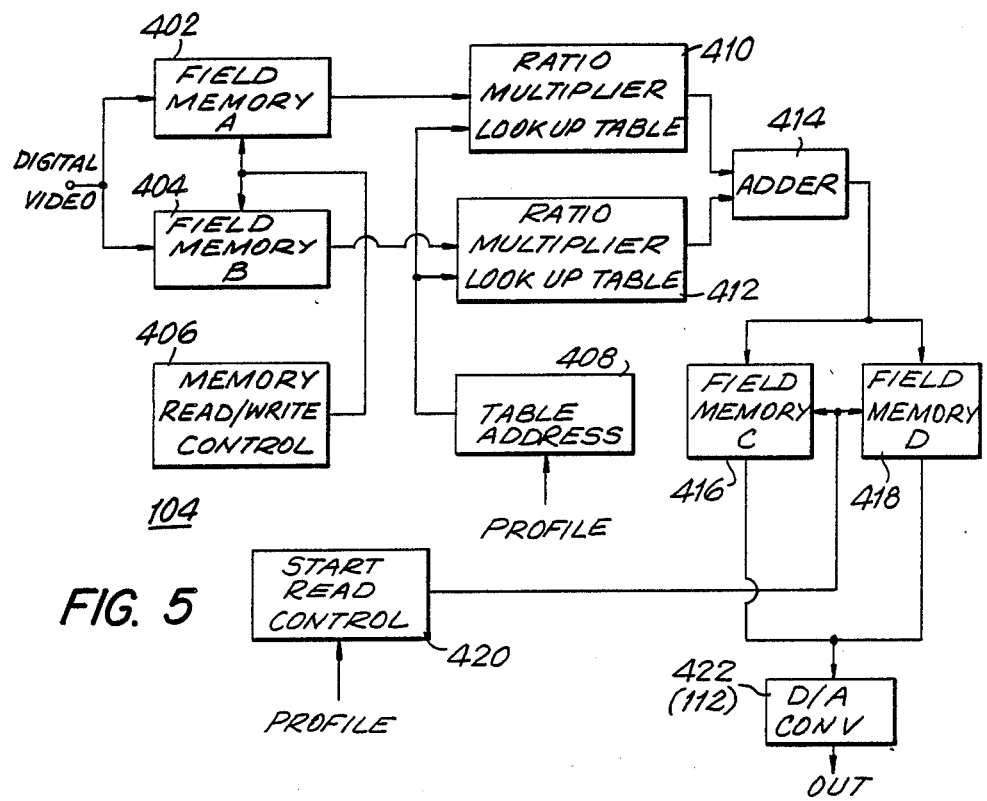
FIG. 5

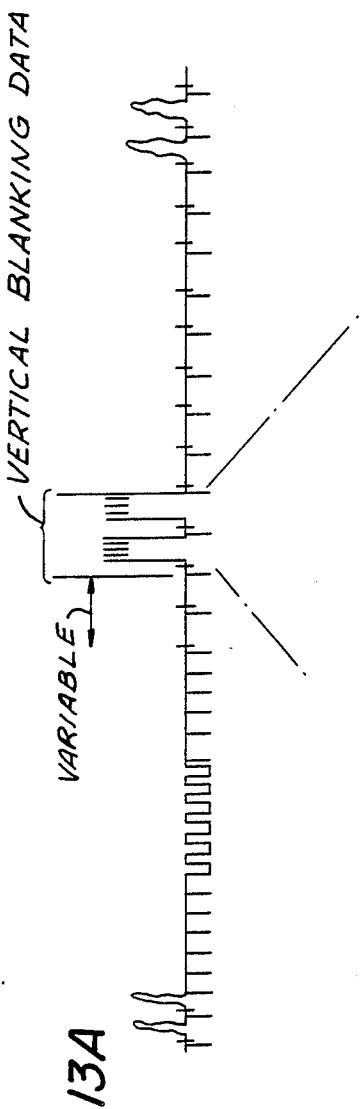
FIG. 13A
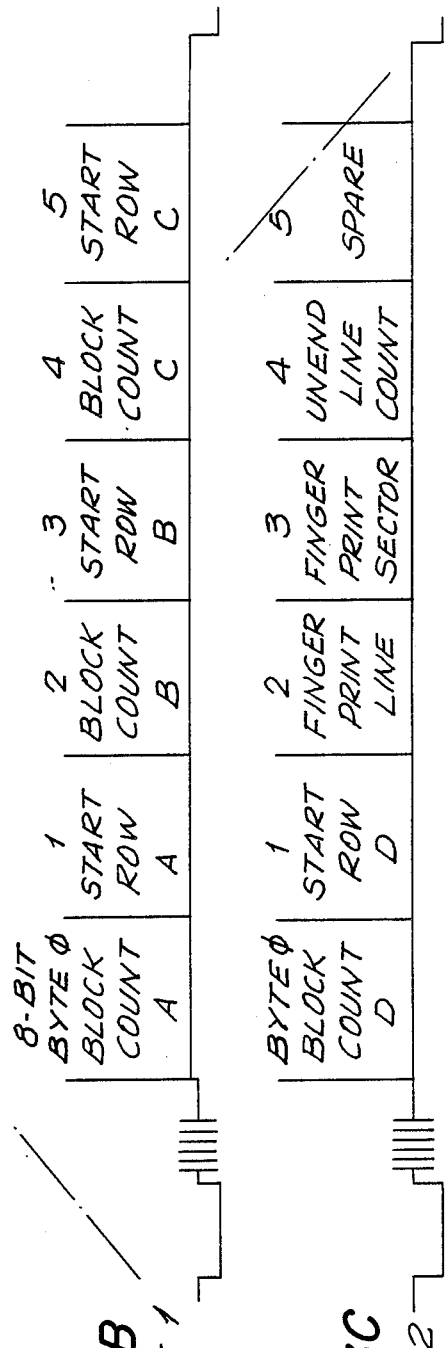
FIG. 13B
LINE 1
FIG. 13C
LINE 2

MODIFYING A TELEVISION SIGNAL TO INHIBIT RECORDING/REPRODUCTION

BACKGROUND OF THE INVENTION

This invention relates to a method and apparatus for modifying a composite television signal to inhibit reproduction of an unauthorized recording thereof by conventional video recorders but enable the display of a video picture therefrom on a television receiver; and, more particularly, to a technique by which the vertical periods, i. e. the lengths of successive frames, of the television signal are varied under the control of a "profile pattern" which may be easily adjusted so as to correspondingly adjust the manner in which the vertical period changes.

With the abundance of video tape recorders (VTR's) now in use in many homes, it has become commonplace for users to record off-the-air television programs for subsequent, and often repeated, viewing. In addition, consumers have enthusiastically accepted pre-recorded video programming, typically, commercially successful motion pictures; and this has resulted in large libraries of pre-recorded video tapes for sale or rent to the public. While such legitimate recordings are welcomed, the financial profit associated with selling or renting pre-recorded video tapes has given rise to illegal piracy. So-called video tape pirates reproduce several, often hundreds of unauthorized copies of a video tape, thereby depriving the rightful owners or distributors of lawful income.

Television subscription networks, such as so-called sattelite or cable television distribution systems, face similar difficulties. To prevent adequate reception by non-subscribers, such television subscription networks typically encode, or "scramble", the distributed television signals, thereby defeating acceptable video displays of those television signals by non-subscribers who are not provided with proper decoders or "descramblers". However, a subscriber may simply connect a video recorder to his decoder so as to record for subsequent and repeated viewing a desired video program that is distributed over the subscription network. Such recording for later viewing decreases the market interested in a re-distribution of that video program over the subscription network. As this market decreases, individuals may terminate their subscriptions and the video program distributor (i. e. the cable network) may suffer financial damage.

Providers of subscription television programming have long proposed so-called "pay per view" broadcasting. This broadcasting contemplates a once-only distribution of valued video programming, such as first-run motion pictures, highly popular sporting events, special entertainment events, and the like, to subscribers who would be charged a one-time fee to receive that video program. Such one-time broadcasting is quite sensitive to video recording which, if permitted, would seriously erode the value of pay-per-view transmission.

Analogous to pay-per-view video distribution is the so-called "electronic theater". As presently envisaged, the electronic theater would be quite similar to a typical motion picture theater, except that actual prints or copies of a motion picture need not be used in each theater. Rather, high resolution television signals can be broadcast simultaneously to several theaters, such as by sattelite transmission, for "real time" display to the theater audience. However, the success of the electronic theater may be contingent, in part, on the ability to prevent unauthorized recording and video tape duplication of the broadcast program.

Of course, scrambling or encoding of a video signal prevents a non-subscriber from recording the video program. However, an authorized subscriber or one who obtains a compatible descrambler may use his VTR to record the descrambled video program. It is preferred that the basic television signal be modified to the extent that even after scrambling/descrambling an acceptable video picture may be reproduced on a conventional television receiver, but the operation of a VTR should be defeated such that it cannot be used to record and reproduce a satisfactory video picture.

One technique proposed for making a television signal nonrecordable relies upon the automatic gain control (AGC) circuitry normally included in a VTR. A large pulse is inserted into the vertical blanking interval to "confuse" the AGC circuitry into substantially attenuating the video signal during recording, thereby making it quite difficult to reproduce a video signal of adequate level. It is believed that this proposal can be easily defeated and, thus, it does not adequately inhibit a VTR from recording and playing back the modified television signal. It also is believed that this technique will defeat the operation of certain addressable "descramblers" used in some cable systems, resulting in an unsatisfactory video picture ultimately displayed on a subscriber's television receiver.

Another technique for modifying a television signal to prevent its recording/reproduction relies upon the relative sensitivity of the vertical synchronizing signal detecting circuitry normally provided in virtually all VTR's. By removing a portion of the vertical synchronizing pulses included in the vertical blanking interval, the vertical synchronizing signal detector included in most VTR's will be unable to detect those vertical sync pulses, resulting in loss of critical servo control information needed for proper operation of the VTR. Since the vertical synchronizing circuitry included in most television receivers is not as sensitive, there is no loss of vertical synchronization in the television receiver. Recently, however, the vertical synchronizing signal detecting circuitry included in VTR's has been significantly improved, and in some instances digital techniques have been used, resulting in the ability of such VTR's to record and reproduce television signals that have been modified as aforesaid.

Various other proposals have been made regarding modification of the vertical synchronizing signal for the purpose of defeating the vertical sync locking circuitry normally provided in VTR's. Some proposals have suggested that some of the horizontal synchronizing signals be deleted from the transmitted television signal; but these suggestions are subject to the same difficulties associated with video signal scrambling techniques: one who has a descrambler or decoder may record the television signal.

One technique which may offer the promise of success contemplates a change in the length of the two video fields which constitute a frame of television signals. U. S. Pat. Nos. 4,488,176 and 4,673,981 both suggest that the frame length may be enlarged or reduced by adding or subtracting horizontal line intervals to each frame. Thus, the frame length varies from its nominal 33.33 milliseconds, depending upon the number of lines which have been added to or deleted from the video frame. In both proposals, however, the rate at which lines are added to and deleted from the frames is fixed, and over a period of time the number of lines which are added is equal to the number of lines which are deleted. Furthermore, in both proposals, the duration of each horizontal line interval is fixed at the standard 63.5 microsecond duration.

OBJECTS OF THE INVENTION

Therefore, it is an object of the present invention to provide an improved technique for modifying a composite television signal so as to inhibit that signal from being adequately recorded/reproduced from a VTR but enable the display of a video picture therefrom on a television receiver.

Another object of this invention is to provide a technique for varying the vertical periods of a television signal, either by varying the number of horizontal line intervals included in each frame or by varying the duration of the respective line intervals in that frame.

A further object of this invention is to provide a technique of the aforementioned type wherein the vertical period is varied in accordance with a "profile pattern" which represents the manner in which the vertical period varies over time.

It is an additional object of this invention to provide a technique as aforementioned wherein the profile pattern is adjustable so as to provide a dynamic variation in the vertical period and thereby accommodate various conditions, restrictions and limitations of the particular television signal broadcast/transmission or supply system with which the modified television signal is used.

Still another object of this invention is to provide a technique as aforementioned, wherein the profile pattern is varied to assure that virtually all types of VTR's are inhibited from adequately recording and reproducing the modified television signal.

Yet a further object of this invention is to provide a technique as aforementioned, wherein the profile pattern is selected and/or modified to minimize perturbations in the video picture displayed by various types of television receivers.

Yet another object of this invention is to provide a technique as aforementioned wherein the profile pattern preferably is selected to provide transitions in the pattern through a level corresponding to a standard vertical period substantially at changes in the scene of the television picture.

A still further object of this invention is to provide a technique as aforementioned wherein the profile pattern can be shifted to modify the maximum and minimum vertical periods, the rate at which the vertical period changes, and the ratio between greater and lesser vertical periods.

It is an additional object of this invention to provide a technique as aforementioned that can be used in a subscription television network.

Another object of this invention is to provide a technique for inserting into a predetermined portion of at least one field in each frame information for controlling the vertical period of that frame, transmitting the television signal containing this information to a distribution source, and then modifying the vertical period of the television signal just prior to distribution.

Various other objects, advantages and features of the present invention will become readily apparent from the ensuing detailed description, and the novel features will be particularly pointed out in the appended claims.

SUMMARY OF THE INVENTION

In accordance with this invention, a technique is provided for modifying a composite television signal to inhibit reproduction of unauthorized recording thereof by conventional video recorders but enable the display of a video picture therefrom on a television receiver. Stated otherwise, the television signal is effectively made nonrecordable. In one embodiment, the time durations of horizontal line intervals included in a first predetermined number of frames of the television signal are increased from a standard horizontal line duration to a pre-established maximum time duration and then are decreased from the pre-established maximum to the standard. Thereafter, the time durations of the horizontal line intervals in a second predetermined number of frames are decreased from the standard to a pre-established minimum time duration and then are increased from the pre-established minimum to the standard. The same number of horizontal line intervals is included in each frame, regardless of the vertical period which is increased or decreased as the time durations of the horizontal line intervals are increased or decreased.

In accordance with one aspect of this embodiment, the number of frames which contain increased horizontal line durations is equal to the number of frames which contain decreased horizontal line durations. As a feature of this aspect, the difference between the standard horizontal line duration and the pre-established maximum time duration is substantially equal to the difference between the standard horizontal line duration and the pre-established minimum time duration.

In accordance with another aspect of this embodiment, the number of frames which contain increased line durations differs from the number of frames which contain decreased line durations. Preferably, however, the integral of the increased line durations over the first number of frames is substantially equal to the integral of the decreased line durations over the second number of frames.

In accordance with yet another feature of this embodiment, the change in the horizontal line durations over a period of time is represented as a profile pattern, and this pattern is used to control the horizontal line durations in respective frames. As one aspect, the profile pattern may be modified to accommodate different conditions and circumstances, without requiring any significant change in the electronics used to modify the television signal. Accordingly, the television signal representing one complete television program may be modified in accordance with several different profile patterns to inhibit different types of video recorders (having different characteristics) from reproducing satisfactory video pictures from the modified television signal.

It is another feature of this embodiment that a change in the scene of the video picture represented by the television signal is detected, and the profile pattern preferably crosses a level corresponding to the "standard" horizontal line duration at the scene change occurrences.

As another feature of this embodiment, the horizontal line intervals are digitized and the digitized video signals are stored in respective addresses of a memory device. The digitized video signals are read out at slower read-out rates to increase the horizontal line durations and at faster read-out rates to decrease the horizontal line durations. The read-out rates are controlled by the profile pattern.

As yet another aspect of this embodiment, the digitized video signals are geometrically corrected such that the first digitized active horizontal video line interval which is read out from the memory corresponds to the top raster line in a displayed video picture notwithstanding the change in the duration of the read out line interval from the standard line duration. Advantageously, the start times at which the digitized active video line intervals are read out from the memory are adjusted as a function of the profile pattern, whereby the start time is delayed when the time durations are increased and the start time is advanced when the time durations are decreased.

As a further feature, the digitized line intervals are comprised of pixels, and a portion of the value of a pixel of one line interval is combined with a portion of the value of an adjacent pixel in the next line interval to produce a composite pixel value, these composite pixel values being stored as compensated digitized line intervals.

In accordance with another embodiment of this invention, the vertical period is increased by increasing the number of horizontal line intervals included in a first predetermined number of frames so as to exceed a standard number of horizontal line intervals normally included in a frame, and the vertical period is decreased by decreasing the number of horizontal line intervals included in a second predetermined number of frames so as to be less than the standard number. A profile pattern represents the rate at which the numbers of line intervals are increased and decreased, the maximum and minimum number of line intervals that may be reached in a frame and the numbers of frames containing the increased and decreased numbers of line intervals.

Advantageously, scene changes in the video picture represented by the television signal are detected, and the profile pattern preferably crosses the level representing the "standard" number of horizontal line intervals in a frame at, or just after, detected scene changes. This minimizes a viewer's perception of video picture perturbations that may be attributable to changes in the vertical period from its nominal duration.

As one aspect of this embodiment, the profile pattern resembles a trapezoid waveform which crosses the standard number of line intervals in a frame at those frames in which a scene change is detected. Other profile patterns, such as sinusoidal or rectangular, may be used.

As a feature of this embodiment, the profile pattern is selectively changed so as to correspondingly change one or more of the following: the rate at which the horizontal line intervals in a frame change, the maximum and/or minimum number of line intervals included in a frame, and the number of frames containing more and/or less than the standard number of line intervals.

As another feature of this embodiment, different profile patterns are stored and those patterns which best defeat the record/playback operability of most VTR's are selected.

As another feature of this embodiment, an offset may be selectively added to the profile pattern so as to "shift" that pattern up or down with respect to the standard number of line intervals included in a frame, thereby changing the manner in which the vertical period is varied without requiring a significant change or modification in the electronics used to modify the television signal.

As another feature of this embodiment, each horizontal line interval is digitized and written into a memory; and the profile pattern is used to determine the number of line intervals in a frame which are read from that memory. Preferably, the stored line interval which is read out as the first "active" line interval from the memory corresponds to the top visible line in the video picture, and the profile pattern is used to change the read-out time of that first active line to compensate for changes in the vertical period. Since the active video line intervals in a video picture are substantially less than the line intervals in a television frame, "black" level video information is generated before and after the active line intervals read from the memory.

BRIEF DESCRIPTION OF THE DRAWINGS

The following detailed description, given by way of example and not intended to limit the present invention solely to the embodiment shown and described herein, will best be understood in conjunction with the following drawings in which:

FIGS. 4A and 4B are diagrammatical representations which are useful in understanding the manner in which frame lengths are adjusted in accordance with this invention;

FIG. 5 is a block diagram representing one manner in which geometric compensation is achieved when using the present invention;

FIGS. 13A-13C are waveform diagrams which are useful in understanding one aspect of the subscription system shown in FIG. 9;

DETAILED DESCRIPTION OF PREFERRED EMBODIMENTS

Figure 1:
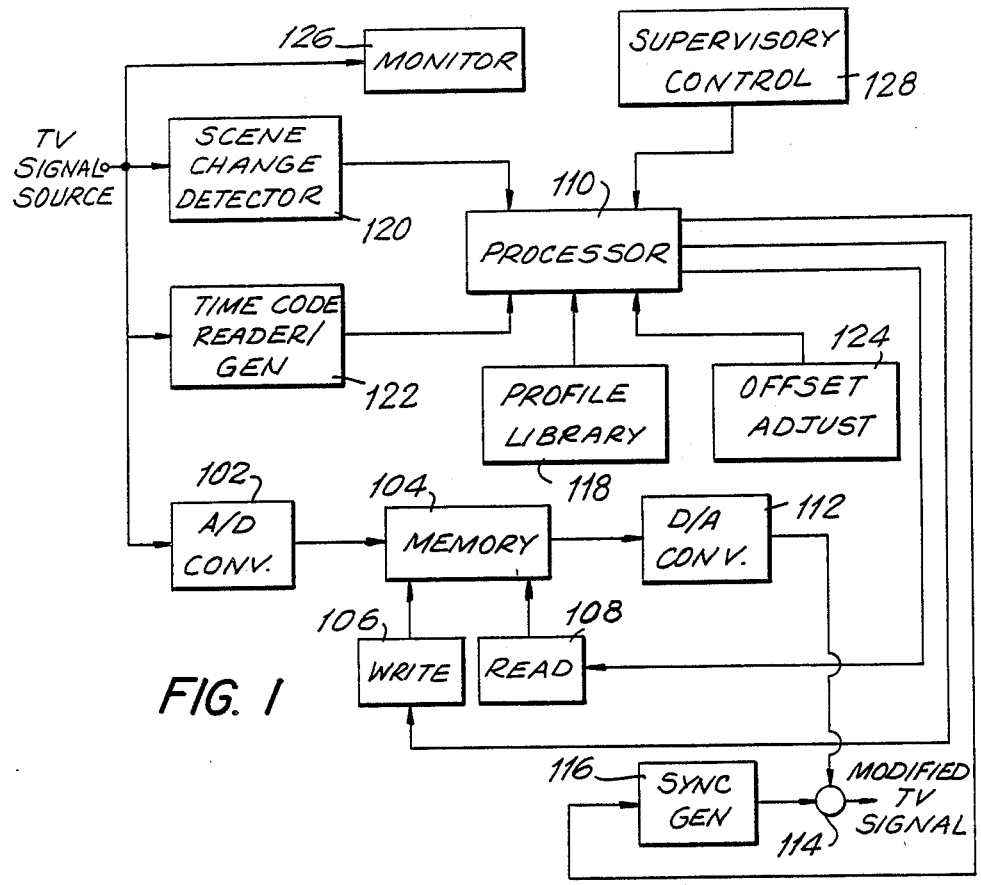
FIG. 1 is a block diagram representing the manner in which the vertical periods (i. e. frame lengths) of a television signal are adjusted in accordance with the present invention.

Referring now to the drawings, wherein like reference numerals are used throughout, and in particular to FIG. 1, there is illustrated a block diagram of one embodiment of the present invention. The apparatus illustrated in FIG. 1 is adapted to modify the vertical period of a television signal so as to increase or decrease the vertical period with respect to nominal field intervals of 16.683 milliseconds, thereby defeating the ability of virtually all commercially available VTR's to record and satisfactorily reproduce a video picture from the modified television signal. By adjusting the vertical period, either by maintaining a constant number of horizontal line intervals but varying the duration of groups of those line intervals, or by adding or deleting line intervals while maintaining a constant duration of each line interval, the capstan and drum servo circuits normally provided in VTR's are inhibited from operating satisfactorily. However, this vertical period adjustment does not prevent the vertical sync detecting circuitry normally provided in most television receivers, including those television receivers recently introduced having digital synchronizing circuitry, from displaying satisfactory video pictures. Thus, the modified television signal cannot be adequately recorded and reproduced, but nevertheless can be satisfactorily received for video picture display on a conventional television receiver.

The system shown in FIG. 1 includes an analog-to-digital converter 102 (referred to hereafter for convenience as an A/D converter), a memory device 104, memory write and read controls 106 and 108, a central processor 110, a digital-to-analog converter 112 (referred to hereafter simply as a D/A converter), a profile library 118 and a scene change detector 120. A/D converter 102 is adapted to digitize a received television signal such that pixels having respective pixel values are produced to represent each horizontal line interval included in the received television signal. As will become apparent, it may not be necessary to digitize the synchronizing information included in the composite television signal and, therefore, A/D converter 102 may be adapted simply to digitize only the useful video information. For example, suitable timing signals may be generated and supplied to the A/D converter such that it operates only during those intervals that useful video information (also referred to herein as "active" video information) is present. As an alternative, a synchronizing signal separator circuit (not shown) may be provided to strip the usual horizontal synchronizing signals (including the usual color burst subcarrier signal) from the composite television signal, thereby supplying A/D converter 102 only with useful video information.

The A/D converter is coupled to memory 104 which, preferably, comprises an addressable memory adapted to store the pixels included in at least each active horizontal line interval that has been digitized by A/D converter 102. For convenience, memory 104 may be thought of as being formed of addressable rows, with each row being adapted to store the pixels which constitute an active horizontal line interval (e.g. line intervals 21 to 241 of a field). Write control circuit 106 and read control circuit 108 are coupled to memory 104 and serve to generate write and read addresses, respectively, as well as timing and other control signals, whereby each line interval may be written into and read from a row of memory 104. As illustrated, write and read control circuits 106 and 108 are coupled to processor 110 and receive address and other control signals from the processor. Thus, the processor is adapted to determine the particular addresses of memory 104 in which digitized horizontal line intervals are stored and from which those digitized line intervals are read. As will be described, each line interval, and preferably each active line interval, is written into memory 104 at a substantially constant, standard write-in rate synchronized with the usual horizontal line frequency $f_H$ of 15.735 KHz; and in one embodiment, read control circuit 108 is adapted to read out from memory 104 each digitized active line interval at a variable read-out rate within a predetermined range determined by processor 110. In one embodiment, the read-out rate may vary from approximately 15.370 KHz to approximately 16.110 KHz. These ranges are not intended to be limitations but, rather, should be viewed merely as illustrative and explanatory of the present invention.

Since each frame of television signals is comprised of alternating field intervals, one being designated an "odd" field and the other being designated an "even" field, it is preferable that memory 104 be thought of as including two field memories, one for the odd field and one for the even. Thus, when pixels are written into the odd memory, the pixels which are stored in the even memory may be read out therefrom. Conversely, after pixels have been read from the even memory, the line intervals contained within the next even field are written into this even memory, and the pixels now stored in the odd memory are read out.

As a further refinement, it is appreciated that, since the rate at which line intervals are read out from memory 104 differs from the rate at which line intervals are written in, it is possible that a field of line intervals may not have been fully read from the field memory at the time that the next field is to be written therein. To accommodate this possibility, memory 104 may be formed of an array of eight memories, such as four memory storage devices to accommodate four odd fields and four memory storage devices to accommodate four even fields. It should be recognized that these numerical examples merely are illustrative and are not intended to limit the present invention solely thereto. Any desired number of odd and even field memories may be used to carry out the present invention. With multiple field memories, it is appreciated that the write and read address signals generated by write and read control circuits 106 and 108 in response to processor 110 include memory select signals such that the appropriate but different field memories are selected for concurrent write-in and read-out operations, as determined by the processor. By using multiple field memories, the possibility of data "collisions" caused by overwriting data into a field memory which has not been fully read out is minimized.

As a still further refinement of memory 104, this memory may be thought of as three separate but substantially identical memory devices, one for each color component normally included in the composite television signal. More particularly, since a composite television signal is comprised of red (R), green (G) and blue (B) components, memory 104 may be thought of as being formed of R, G and B memory devices, each memory device being comprised of multiple (e.g. eight) field memories. Consistent with this concept of R, G and B memories, A/D converter 102 may be thought of as being comprised of R, G and B A/D converters. Since the television signal supplied to the A/D converter typically is in NTSC format, an NTSC-to-RGB decoder may be provided (not shown) to separate the received composite television signal into its three color components and to supply these color components to the R, G and B A/D converters, respectively. The output of memory 104, which is understood to comprise the outputs of the field memories and, if separate RGB memory devices are used, the outputs of the field memories included in each of the RGB memory devices, is coupled to D/A converter 112. For the embodiment wherein separate RGB memory devices are used, D/A converter 112 may be thought of as being comprised of separate R, G and B D/A converters.

The D/A converter is adapted to convert the digitized pixel values to an analog signal, thus effectively recovering the original useful information contained in the original television signal, with new vertical timing determined by the read-out rate provided by read control circuit 108. Thus, the D/A converter reconstructs the original television signal, but with increased or decreased horizontal line interval durations, as will be further described.

D/A converter 112 is coupled to a mixer 114 which also is coupled to a synchronizing signal generator 116. The mixer functions to insert the usual horizontal and vertical synchronizing signals, burst signals and equalizing pulses conventionally used in NTSC format, as well as the "non-active" line intervals (e.g. lines 1 to 20 and 242 to 262 of a field). The output of the mixer thus comprises the modified television signal containing the original video information but with lengthened or shortened vertical periods, depending upon whether the horizontal line intervals in the respective fields have been increased or decreased. This modified television signal then may be transmitted to conventional television receivers which, notwithstanding the changed vertical periods, reproduce an accurate video picture. However, if this modified television signal is supplied to a conventional VTR, the changed vertical periods inhibit that VTR from recording and accurately reproducing an acceptable video picture. Hence, unauthorized production of video tapes is effectively prevented.

Processor 110 is coupled to profile library 118 which comprises a storage device, such as a read only memory (ROM) that stores profile data representing the manner in which the vertical periods are lengthened or shortened over a period of time. Profile data corresponding to several different profiles are stored in profile library 118, and processor 110 is adapted to select a desired one of those profiles for controlling the operation of read control circuit 108. As an example, the profile data establishes the duration of each line interval in a particular frame. For instance, the profile data may establish the duration of the horizontal line intervals for the first frame to be 63.56 microseconds, whereas the duration of the horizontal line intervals in, for example, frame #16 may be 65.03 microseconds. Likewise, the profile data may establish the duration of the line intervals included in frame #78 to be 62.10 microseconds. Of course, the line durations of the various frames therebetween and thereafter also are established by this profile data. Thus, when a particular frame of the television signal is received, the read-out rate associated with that frame is determined by the selected profile, and the duration of the line intervals included in that frame is set accordingly.

Processor 110 also is coupled to time code reader/generator 122. In one application of the present invention, the source of the television signal supplied to the illustrated apparatus comprises a video recorder which, as is known, includes a time code reader for reading the time code normally recorded on the video tape. Thus, when a video recorder is used as the source of the television signal, a time code identification of each reproduced frame may be provided to accompany that frame. However, if the source of the television signal is other than a video recorder, or if the time code is not present, it is desirable to identify each frame of that television signal. Consequently, a time code frame identification for each frame is generated by time code reader/generator 122. It is appreciated, therefore, that the time code reader/generator serves to supply processor 110 with an identification of each frame in the received television signal. This frame identification information is used by processor 110 in conjunction with the profile data retrieved from profile library 118 to control the reading out of line intervals from memory 104.

The present invention serves to increase and decrease the lengths of frames included in the television picture over a period of time. As will be described, the frame lengths are changed either by changing the durations in the line intervals included in each frame, thus increasing or decreasing the overall time duration of the frame, or by adding or deleting line intervals to the frame. From observation and experimentation, when either embodiment is adopted, visual perturbations and interference in the video picture which eventually is displayed will be minimized if changes in the lengths of frames pass through "standard" lengths (e.g. 16.683 milliseconds) when (or just after) changes in the televised scene are detected. For this reason, and as will be described in greater detail below, scene change detector 120 is coupled to processor 110 to apprise the processor of the particular frame in which a scene change is detected.

The detection of a scene change may be carried out by using conventional devices, such as Oak Communications, Inc. video scene change detector Model CTV 0725, or other circuitry which may detect, for example, a significant difference in the overall luminance level of one field or frame relative to that of a preceding field or frame. Other techniques known to those of ordinary skill in the art may be used to detect a scene change. From experience, it has been found that, in a typical program created specifically for television broadcasting, a scene change occurs on the average of once every five seconds.

It is desirable to provide a supervisory override to a programmed change in the vertical period at certain conditions. For example, if the video picture corresponding to the television signal to be modified includes a pattern of horizontal lines, such as a video picture wherein venetian blinds constitute a prominent portion, changes in the vertical period during such frames may result in a noticeable disturbance in the video picture. In those instances, it is preferred to reduce deviations in the vertical period from the standard 16.683 milliseconds until a frame is reached that is substantially free of such horizontal lines. Thereafter, the programmed vertical period changes may continue. However, the standard vertical period is retained for only a relatively few frames to prevent those television receivers having digitized synchronizing circuitry from "locking" onto the standard vertical period, and thereby becoming unable to "follow" subsequent changes in the vertical period.

In this regard, a monitor 126 is coupled to receive and display the television signal and a supervisory control 128 is coupled to processor 110 to permit a supervisor to supply a signal to the processor for halting continued changes in the vertical period. The supervisory control may include a keyboard or other input device by which an appropriate signal may be supplied through the processor. It is appreciated that other characteristics of the video picture may result in noticeable interference if the vertical period corresponding to that picture is changed. Supervisory control 128 thus provides a manual override to vertical period changes when the supervisor observes such picture content.

The operation of the television signal modifying apparatus shown in FIG. 1 now will be described with reference to two embodiments: one wherein the vertical period is changed by varying the durations of the line intervals included in each frame; and the other wherein the vertical period is changed by adding or deleting line intervals to or from the frame. In the first embodiment, although the horizontal timing is changed, the number of line intervals included in each frame is fixed. In the other embodiment, the number of line intervals included in each frame is varied, but the duration of each line interval remains fixed.

Figure 2A:
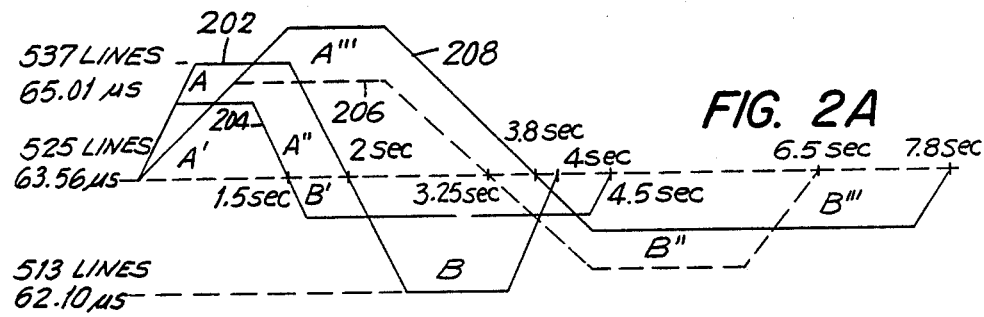
FIGS. 2A and 2B are graphical representations of profile patterns used by the present invention.

Both embodiments operate in conjunction with the profile data stored in profile library 118. As mentioned above, the profile data represents the manner in which the vertical period changes over a period of time. A graphical representation of the profile pattern corresponding to the profile data stored in profile library 118 is represented by the waveforms shown in FIG. 2A. Merely as an example, four separate profile patterns 202, 204, 206 and 208 are illustrated, and each of these patterns broadly resembles a trapezoidal waveform, although other waveforms, such as sinusoidal or rectangular, may be used. The ordinate of FIG. 2A represents the vertical period, either in terms of the total number of lines included in a frame or the average duration of each line interval within that frame, and the abscissa represents time. It will be appreciated that the abscissa also represents the particular frame of the television signal, such as identified by time code reader/generator 122. Thus, the profile patterns shown in FIG. 2A represent the length of each frame and further indicate that the frame lengths vary relative to the standard length of 525 lines (or the standard horizontal line interval of 63.53 microseconds).

From profile pattern 202, it is seen that the vertical period of the modified television signal increases from the standard length to a length equal to 537 lines (or a length formed of 525 lines, each having an average line interval duration of 65.01 microseconds). Thereafter, the vertical period remains at this maximum level for a predetermined number of frames, whereafter the vertical period decreases toward the standard length and then is reduced below that length toward a minimum vertical period shown as 513 lines (or a minimum length formed of 525 lines each having an average line interval duration of 62.10 microseconds). The vertical period then remains constant for another predetermined number of frames, whereafter the vertical period increases from its minimum length (513 lines) towards its standard length. Profile patterns 204, 206 and 208 are similar but, as is readily apparent, exhibit markedly different characteristics. In the examples shown, the profile patterns may vary, one from the other, with respect to the rate at which the vertical period increases or decreases with respect to time, the total number of frames having greater than standard length, the total number of frames having less than standard length and the maximum and minimum frame lengths. The illustrated profile patterns are comprised of positive and negative portions, the positive portion of each representing those frames having greater than standard vertical period and the negative portion of each representing those frames having less than standard vertical period. It has been found that if the area under the curve corresponding to the positive portion, shown as area A, is equal to the area under the curve of the negative portion, shown as area B, there is no net increase or decrease in vertical period and, therefore, there is no net delay or advance in the overall vertical period. Furthermore, it is preferred that the area A (as well as the area B) be such that the capacity of memory 104 is not exceeded, i.e. the accumulated delay between read-out and write-in does not exceed the storage space of the memory, so that a frame of video information is not dropped.

In profile pattern 204, although the total number of frames having increased vertical period is seen to be less than the total number of frames having decreased vertical period, and although the maximum increase in the vertical period is seen to be greater than the maximum decrease in vertical period, nevertheless the area A' under the positive portion of profile pattern 204 is substantially equal to the area B' under the negative portion of this profile pattern. Likewise, the area A" under the positive portion of profile pattern 206 is equal to the area B" under the negative portion of this profile pattern. Also, the area A'" under the positive portion of profile pattern 208 is equal to the area B'" under the negative portion of this profile pattern. That is the integral of the increased vertical period over those frames having greater than standard frame length is substantially equal to the integral of the decreased vertical period over those frames having less than standard frame length. Thus, notwithstanding the marked differences in the illustrated profile patterns, by reason of these equal positive and negative areas (or integrals), the overall timing of the vertical period, averaged over time, is approximately "standard", thereby minimizing accumulated delays and avoiding sound/video mis-synchronization.

Desirably, the selected profile pattern should cross the abscissa at the time of occurrence of a scene change in the video picture. This is because maximum perturbation in the video picture generally will occur during this transition between maximum and minimum levels in the profile pattern but such perturbation will not be noticed by a typical television viewer if a scene change also occurs at (or just prior to) that time. By providing an inventory of profile patterns in profile library 118, the particular pattern providing a "best fit" to accommodate detected scene changes may be selected to control the manner in which the vertical period is changed. It is expected that scene changes of a television program may occur with varying frequency; and processor 110, upon detecting changes in the frequency of occurrence of scene changes, selects a more appropriate profile pattern to satisfy the "best fit" objective. Furthermore, some television receivers may exhibit instability if the maximum or minimum vertical period is maintained for more than a few (e.g. 100-200) frames, and the processor selects profile patterns that reduce the possibility of such instability yet defeat the satisfactory operation of conventional VTR's. It is appreciated, therefore, that the selection of the profile pattern to be used to control changes in the vertical period may vary while processing the television signal.

Additionally, in the event that some VTR's nevertheless operate adequately while the vertical period varies under the control of a particular profile pattern, a pattern may be selected from profile library 118 which, from experience, is known to defeat the successful operation of even those VTR's. Hence, from time to time, processor 110 selects that profile pattern for controlling the vertical period adjustment operation; thereby minimizing perturbations in video picture display while maximizing nonrecordability of the television signal.

Figure 9:
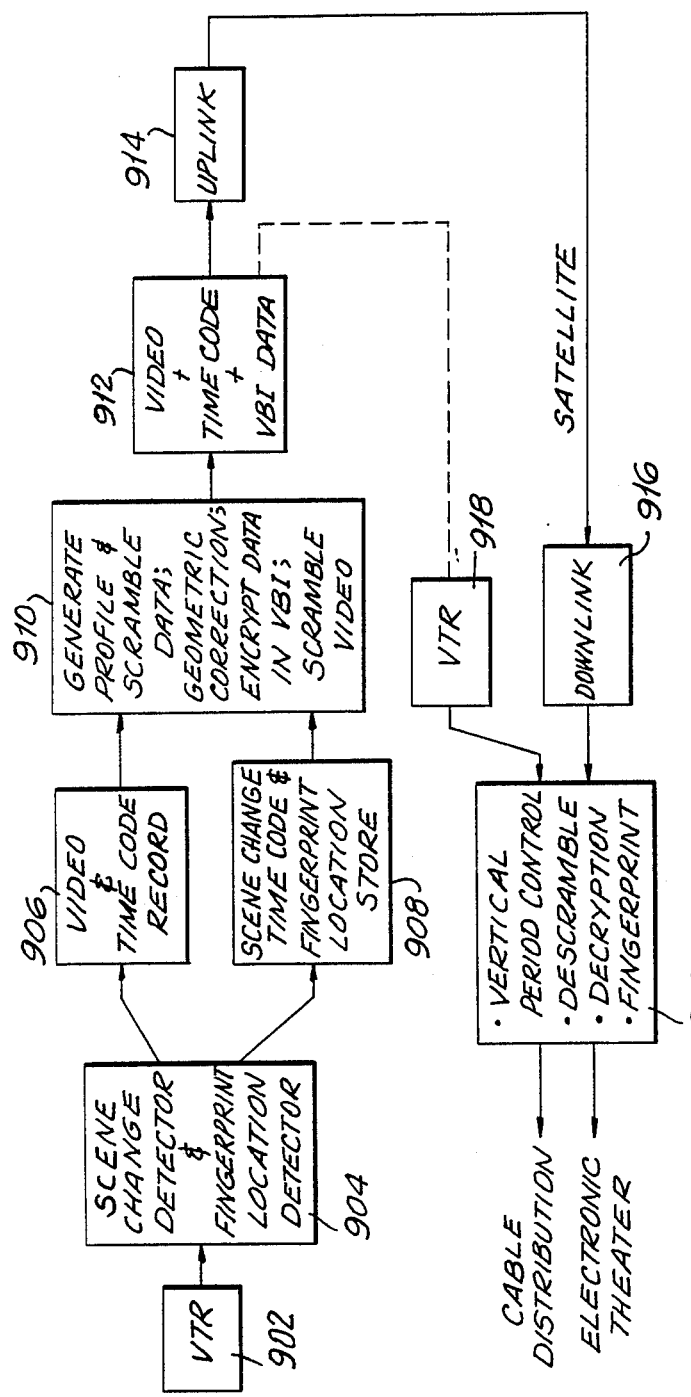
FIG. 9 is a block diagram of an overall television subscription system in which the present invention finds ready application.

Still further, if the present invention is used in conjunction with a subscription television distribution network, such as shown in the system diagram of FIG. 9, certain constraints and restrictions may be imposed upon the selection of the profile pattern, depending upon the operating characteristics of the television distribution network. For example, the subscription encoding/scrambling circuitry may limit the minimum number of line intervals included in a frame. If this minimum number is greater than the minimum number of lines established by, for example, profile pattern 202, then profile pattern 204 or profile pattern 208 may be substituted. Profile library 118 thus accommodates the constraints imposed by the particulars of the television subscription network with which the present invention may be used.

Figure 2B:
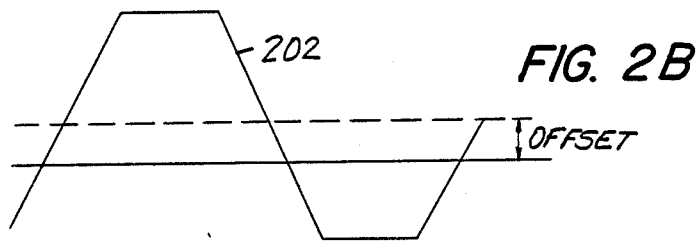

Another technique for accommodating the aforementioned constraint which may limit the minimum (or maximum) number of line intervals included in a frame is represented by offset adjustment control 124, and is depicted in FIG. 2B. The offset adjustment control serves to add an offset to the profile data, thereby effectively raising or lowering the profile pattern with respect to the abscissa. FIG. 2B represents profile pattern 202 with a negative offset added thereto, thereby resulting in an effective "lifting" of the profile pattern. This offset may be achieved by, for example, adding a predetermined number of lines (e. g. 2, 4, 6, etc. lines) to the profile data included in a selected profile.

Although the profile patterns shown in FIGS. 2A and 2B are illustrated as relatively smooth curves having progressively increasing and decreasing leading and trailing edges, it is contemplated that abrupt changes (e.g. spikes) may be provided in the patterns, whether intentional or inadvertent.

Briefly, in operation, a received television signal, which may be supplied from a video recorder or from conventional television signal generating or transmitting apparatus, is digitized by A/D converter 102 to produce pixels having respective pixel values over the active video portion of each line interval. Successive lines of pixels in each received video field are written into a field memory included in memory 104 under the control of write control circuit 106. As mentioned above, the pixels are written into the memory at a standard, fixed rate synchronized with the normal horizontal synchronizing frequency $f_H$. As one field of pixels is written into memory 104, a preceding field of pixels is read from the memory under the control of read control circuit 108. In one embodiment, the rate at which the pixels are read from the memory is varied, as represented by the profile patterns shown in FIG. 2A, under the control of processor 110. A profile pattern stored in profile library 118 is selected as aforesaid, and this selected profile pattern thus controls the increase and decrease in the rate at which the lines of pixels are read from memory 104. It is seen that, as the read-out rate increases, the duration of the line interval of pixels read from a row of memory 104 is reduced. Conversely, as the read-out rate decreases, the duration of this line interval increases.

Preferably, the read-out rate and, thus, the duration of each line interval is not changed. Rather, the read-out rate is changed once every twenty-five line intervals. Furthermore, this read-out rate is increased or decreased by about 8 nanoseconds for each change in the read-out rate. As a result, the duration of the line intervals included in a field changes by approximately 100 nanoseconds from the beginning to the end of that field. It has been found that a change in the line duration of 100 nanoseconds over a video field interval will not disturb or interfere with the normal video display of a television receiver. Thus, the length of each frame may increase or decrease by approximately 200 nanoseconds from its preceding frame.

Time code reader/generator 122 identifies for processor 110 each frame that is received. By comparing the actual frame count of the received television signal with the frame count included in the profile pattern selected from profile library 118, processor 110 supplies read control circuit 108 with read-out data which establishes the proper read-out rates for the line intervals included in that frame. Thus, each line of pixels is read from memory 104 with a line duration determined by the selected profile pattern; and these pixels are reconverted into an analog video signal by D/A converter 112. Nevertheless, these analog video signals now exhibit the line durations which have been determined by the selected profile.

Mixer 114 adds to the active video signals supplied by D/A converter 112 the usual horizontal synchronizing signals, burst signals, equalizing pulses, vertical synchronizing pulses and non-active horizontal line intervals. The reconstituted but modified television signal then is transmitted from the mixer.

As scene changes in the received television signal are detected by scene change detector 120, processor 110 determines which of the profile patterns stored in profile library 118 constitute the "best fit" to the occurrences of those scene changes. Should a different profile pattern be found to provide this best fit, processor 110 selects that new profile pattern for controlling the operation of read control circuit 108. Furthermore, the processor periodically selects a profile pattern known to defeat the operability of virtually all conventional VTR's, as well as a profile pattern that will not result in the "lock up" of television receivers having digital synchronizing circuitry, as mentioned above.

The received television signal also is displayed on monitor 126. If a supervisor observes that the video picture contains components which will result in visual interference if the vertical period corresponding to that video picture is changed, the supervisor may override the aforedescribed vertical period adjustment operation. In that event, no deviations from "standard" are made to the vertical period, that is, no changes are made in the read-out rate, until the supervisor determines that such interference in the video picture no longer will be present. Changes in the read-out rate then may resume.

In the alternative embodiment, the rate at which line intervals of pixels are read from memory 104 remains constant. However, the number of lines included in a frame is increased or decreased, as represented by the profile patterns shown in FIGS. 2A and 2B. The particular address of memory 104 which is selected for a read-out operation is, of course, determined by read control circuit 108 under control of processor 110. The profile pattern establishes the number of the lines included in each frame read from memory 104, and processor 110 advantageously varies the start time at which the first line of active video information is read from memory 104 by read control circuit 108.

In the event that the profile pattern calls for the number of lines included in a frame to be greater than the standard number (e. g. greater than 525 lines), processor 110 commands synchronizing signal generator 116 to continue to generate non-active (or "black") horizontal line intervals which are supplied by mixer 114 as the output TV signal; and the processor also commands read control circuit 108 to delay the time at which the stored lines of active video information are read from the memory. Hence, although the same number of active lines are included in the output TV signal, the total number of lines therein is greater than the standard number because synchronizing signal generator 116 supplies "extra" black lines. Alternatively, if less than the standard number of lines is to be included in a frame, thereby reducing the frame length, processor 110 interrupts the generation of black horizontal line intervals by synchronizing signal generator 116, and concurrently advances the time at which read control circuit 108 reads the stored lines of active video information from memory 104.

Figure 3A:
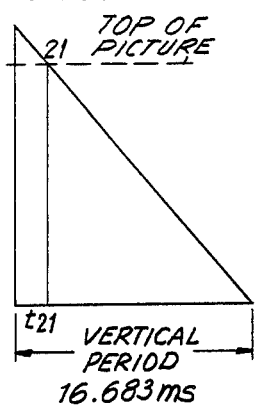
FIGS. 3A-3C are graphical representations of the manner in which vertical compensation in the video picture is attained when using the present invention.

It will be appreciated that as the period of each field interval increases and decreases, whether by changing the number of lines included in a frame or by changing the duration of the line intervals in a frame, a vertical shift is imparted into the video picture which is displayed from the modified television signal. For example, and with reference to the embodiment wherein the vertical period is changed by changing the number of lines included in the frame, the line interval which typically is displayed as the first raster line of the video picture, that is, the line interval which constitutes the top of the video picture, usually is line interval #21. If the vertical period is increased (i. e. if the frame length is increased), line interval #21, if read out at the same time as normally read in a vertical period of standard length, will not be displayed as the first raster line (i.e. as the top line). Rather, a later line interval, for example, line interval #22, now would constitute the first raster line of the displayed video picture. Conversely, if the vertical period is decreased, line interval #21, if read out at the same time as normally read in a vertical period of standard length, may constitute the second or third raster line of the video picture; and a preceding line interval, such as line interval #20 now would constitute the first raster line of the video picture. The foregoing is graphically represented in FIGS. 3A–3C.

Figure 3B:
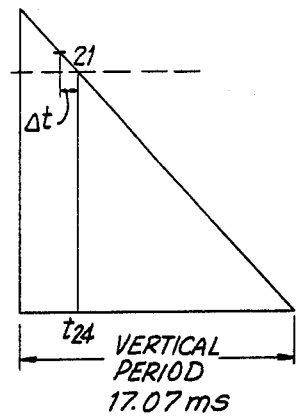
Figure 3C:
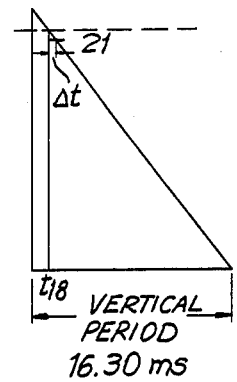

To compensate for this vertical shift in the position of the top line of the video picture, processor 110 controls read control circuit 108 to advance or delay the time at which it addresses the row of memory 104 in which line interval #21, the first active line of the video picture, is stored. Thus, when the vertical period is increased, as shown in FIG. 3B, read control circuit 108 addresses memory 104 to read out at a later time ($\Delta t$) the row in which the pixels of line interval #21 are stored. Conversely, if the vertical period is decreased, as shown in FIG. 3C, read control circuit 108 addresses memory 104 to read out at an earlier time ($\Delta t$) the row in which the pixels of line interval #21 are stored. Thus, the read address is controlled such that the row read from memory 104 which contains the first raster line in the video picture is delayed or advanced depending upon whether the vertical period is increased or decreased, respectively. As a numerical example, line interval #21 may read from the memory at the time when line interval #24 normally is read, in the event that the vertical period is increased (FIG. 3B); and line interval #21 may be read from the memory at the time when line interval #18 normally is read, in the event that the vertical period is decreased (FIG. 3C).

In describing the operation of the apparatus illustrated in FIG. 1, it has been assumed that memory 104 is comprised of several field memory devices. As represented diagrammatically in FIGS. 4A and 4B, lines of pixels are written into the field memories during a time duration T and are read from those field memories over another time duration T'. It is recognized that these time durations T and T' normally are not equal because the read-out duration is increased or decreased to change the vertical period, as discussed above.

In the representation of FIGS. 4A and 4B, it is assumed that immediately after a field memory is filled, or loaded, it is unloaded. However, a delay in the unloading of a memory may be provided, for example, four field memories may be loaded before the first field memory is unloaded. Processor 110 is adapted to determine when a particular field memory selected for a loading operation has not yet been fully unloaded. When that occurs, the incoming field, and more particularly, the incoming frame, simply is discarded. If FIG. 4A represents the field memories which are loaded and FIG. 4B represents the field memories which are unloaded, it is seens that the nth unload cycle of field memory A ends just as, or slightly later than, the time at which this very same field memory is to be loaded for the (n+1)th time. This overlapping of the loading and unloading of the very same field memory could result in interference and, therefore, processor 110 simply discards the fields which otherwise would have been loaded into field memories A and B during this (n+1) th cycle.

The number of memory load (and unload) cycles which can be executed before a data collision occurs, that is, before the very same field memory is selected for loading before it has been fully unloaded, may be determined as follows: Let N be the number of such memory load cycles that may be carried out before a data collision occurs. That is, N is the number of memory load cycles which may be carried out before an incoming frame of video information must be dropped. Then:

T = the duration needed to load a field memory.
T' = the duration needed to unload a field memory.
P = T/T'.
M = the number of field memory devices (in the present example, M=8).
N = (P +1)/M(P−1)−1/(P−1).

A modification in the apparatus illustrated in FIG. 1 is contemplated. As described above, scene change detector 120 operates concurrently with the loading of memory 104; and as mentioned above with respect to FIGS. 4A and 4B, a field memory is unloaded immediately after it has been loaded. Processor 110 selects a profile pattern from profile library 118 to best fit the scene changes detected by scene change detector 120. In the event that additional time is needed for processor 110 to select the appropriate profile pattern, suitable delays may be imparted, where necessary. For example, several field memories may be loaded before the first field memory is unloaded. As a further alternative, the television signal may be supplied to scene change detector 120 while it concurrently is recorded. Then, the recorded television signal may be played back to A/D converter 102 for loading into memory 104. The inherent delay provided in recording and then reproducing the television signal should accommodate any time delays needed to detect scene changes and select the appropriate profile patterns for controlling the frame length of the modified television signal.

For the embodiment wherein the vertical period is changed by changing the line interval durations therein, both horizontal and vertical geometric distortions in the video picture may result. This is because the vertical distance traversed by the slight slant of each horizontal raster line varies if the horizontal line duration varies. As the line duration increases so too does the vertical distance traversed by this raster line. Conversely, as the line duration decreases, the vertical distance covered by the slight slant of this line also decreases. It has been found that geometric correction generally is not needed for those fields in which the ratio P (discussed above with reference to FIGS. 4A and 4B) is approximately unity. However, as P increasingly deviates from unity, that is, as the profile pattern approaches its maximum and minimum levels, distortion compensation is appropriate.

FIG. 5 is a block diagram representing one embodiment by which geometric compensation is effected for the embodiment wherein the vertical period is varied by changing the durations of the horizontal line intervals. This compensation arrangement is comprised of field memories 402 and 404, field memories 416 and 418, look up tables 410 and 412, a table address generator 408 and an adder 414. Field memories 402, 404, 416 and 418 may be viewed collectively as an embodiment of memory 104 (FIG. 1). Field memories 402 and 404 are adapted to receive the line intervals of pixels produced by the A/D converter, and the addresses in which these lines of pixels are stored are determined by memory read/write control circuit 406. As an example, field memory 402 is adapted to store the line intervals of an odd field and field memory 404 is adapted to store the line intervals of an even field. The output of field memory 402 is coupled to look up table 410 and the output of field memory 404 is coupled to look up table 412.

Each of the look up tables stores data representing different proportions of pixel values. To provide geometric compensation, a portion of a pixel in one line interval is added to another portion of a pixel in the next adjacent line interval (i.e. the line interval adjacent thereto in the video display), and the resultant reconstituted pixel is used as a replacement for the original. Depending upon the particular location in the profile pattern, these proportions vary. The particular pixel read from field memory 402 constitutes a portion of the address for look up table 410, and the particular present location in the profile is used to generate another portion of this look up table address. Table address generator 408 is coupled to receive profile data from processor 110 and to generate address data corresponding to the present location on the profile pattern. In response to the addresses represented by table address generator 408 and the pixel values supplied by field memory 402, the proportion of the pixel value stored in the addressed location of look up table 410 is read out and supplied to adder 414.

Similarly, look up table 412 is coupled to field memory 404 and to table address generator 408 and serves to supply to adder 414 the proportion stored in the location then being addressed. It is appreciated that the look up tables may comprise read only memory devices.

Adder 414 is adapted to combine the proportions of pixel values supplied thereto by look up tables 410 and 412 to produce a re-valued pixel. The adder is coupled to field memories 416 and 418 which function as odd and even field memories, respectively, to store the re-valued pixels therein. Although not shown, it will be appreciated that the line intervals of re-valued pixels stored in field memories 416 and 418 are read out under the control of read control circuit 108 in the manner discussed above. Hence, memories 416 and 418 may be thought of as arrays of memories similar to the arrays described above for memory 104 (FIG. 1). The outputs of field memories 416 and 418 are coupled to D/A converter 422 which reconstructs a compensated analog video signal whose vertical interval has been increased or decreased in accordance with the selected profile pattern.

A start read control circuit 420 also has been provided for the purpose of adjusting the start time at which a line of pixels stored in memory 416 or 418 is read out. Start control circuit 420 is coupled to field memories 416 and 418 and is responsive to the profile data supplied thereto by processor 110 to determine the start time at which the respective line intervals are read from these field memories. As will be appreciated, the start time is advanced (i.e. it is generated earlier in the read cycle) when the durations of the line intervals are increased and the start time is delayed when the durations of the line intervals are decreased.

In operation, digitized line intervals of the television signal, more particularly, the pixels which constitute the active video portion of each line interval, are supplied to field memories 402 and 404. Memory read/write control 406 selects one of the field memories to store successive line intervals during the reception of one field, and then the other field memory is selected to store the line intervals included in the next-following field. For example, an odd field of line intervals is stored in field memory 402 and then the next-following even field of line intervals is stored in field memory 404. Although only two field memories are illustrated, it will be appreciated that eight field memories may be used to accommodate the eight fields included in four successive frames.

After field memories 402 and 404 are loaded, they are unloaded by reading out the line intervals stored therein. Preferably, each pixel in the line interval is read out in succession. Of course, the particular location on the profile pattern at the time a field memory is unloaded is known from the profile pattern supplied to table address generator 408. Depending upon the profile data supplied to the table address generator, an address signal is generated and applied to look up tables 410 and 412. In addition, as a pixel is read out of field memory 402, its pixel value is supplied to look up table 410 and constitutes another portion of the table address. Thus, the combination of the pixel value and profile data is used to address look up table 410 which, in turn, supplies to adder 414 data representing a particular portion, or percentage, of the pixel value read out from field memory 402.

At the same time that a line interval is read out of field memory 402, a line interval which would be displayed as the next adjacent line in the video picture produced in response to the contents of field memories 402 and 404 is read from field memory 404. The read out timing of the field memories is such that, when a particular pixel is read from field memory 402, the pixel in the next adjacent line interval which lies, for example, directly below this pixel, is read from field memory 404. This pixel value read from field memory 404 constitutes a portion of the address of look up table 412, and the table address which had been generated by table address generator 408 in response to the profile data supplied thereto is used as another portion of the address for look up table 412. Hence, data is supplied from look up table 412 to adder 414 which represents that portion or percentage of the pixel value read from field memory 404 as determined by the present location along the profile pattern as represented by the profile data supplied to table address generator 408.

Adder 414 adds that portion of the pixel data read from field memory 402 to that portion of the pixel data read from field memory 404 to produce a "corrected" value of the pixel read from field memory 402. This corrected value is stored in field memory 416 in the same location as the original pixel occupied in field memory 402. Thus, the original pixel value is replaced by the corrected pixel value.

This same operation is carried out when the next pixels are read from field memories 402 and 404 until field memory 416 is supplied with a line interval of corrected pixel values. Then, the next line interval stored in field memory 402 is read out, and a portion of each pixel value in that line interval is added to a determined portion of each pixel value in the line interval re-read from field memory 404. As a result, adder 414 produces "corrected" pixel values for the line interval now read from field memory 404; and these corrected pixel values now are stored in field memory 418 in the same location as the original pixels occupied in field memory 404.

As a numerical explanation, let it be assumed that line 55 of field memory 402 and line 56 of field memory 404 are read out (it is recognized that the lines of the odd and even fields are interlaced). Let it be further assumed that each line interval contains approximately 900 pixels. Now, as an example, when pixel 150 of line 55 is read from field memory 402, pixel 150 is read from line 56 of field memory 404. Look up table 410 supplies a percentage of the value of pixel 150 from line 55 and look up table 412 supplies a percentage of the value of pixel 150 from line 56. Adder 414 adds the percentage of the value of pixel 150 from line 55 to the percentage of the value of pixel 150 from line 56 to produce a "corrected" value for pixel 150 of line 55. This corrected value of pixel 150 in line 55 is written into field memory 416 at the proper location in the row in which line 55 is stored. This operation continues until field memory 416 stores a "corrected" field of pixels.

Next, line interval 57 is read from field memory 402 and line 56 is re-read from field memory 404. When, for example, pixel 150 of line 57 is read from field memory 402, look up table 410 is addressed to supply to adder 414 a percentage of the value of pixel 150. Likewise, when pixel 150 of line 56 is read from field memory 404, look up table 412 is addressed to supply to adder 414 a percentage of the value of this pixel. Adder 414 combines the percentages of the values of pixel 150 from lines 57 and 56, respectively, to produce a "corrected" pixel value. This corrected value of pixel 150 is stored in field memory 418 at line 56 and, thus, replaces the original value of pixel 150 from line 56 read from field memory 404.

From the foregoing, it is seen that corrected odd and even fields are stored in field memories 416 and 418, respectively, thereby providing geometric compensation to distortions which otherwise may arise when the vertical period is increased or decreased by increasing or decreasing the durations of the line intervals included therein.

It is recognized that, as the duration of a line interval increases beyond standard, that is, a line interval greater than 63.56 microseconds, the first pixel which corresponds to the left edge of the video picture corresponding to that line interval is effectively "shifted" to the right. To place this first pixel at the left edge of the video picture, the start time at which this line interval is read from field memory 416 (or field memory 418) should be shifted to the left. Stated otherwise, the start time at which the line interval begins to be read out of the field memory should be advanced relative to a "standard" start time. Conversely, if the duration of the line interval is decreased below standard, the first pixel in the displayed portion of this line interval is effectively shifted to the left. To reposition this pixel of the shortened line interval at the left edge of the video picture, the start time at which this line interval is read out from the field memory should be delayed relative to the standard start time. Horizontal start control circuit 420 is responsive to the profile data supplied from processor 110 to advance or delay the start time for reading out each line interval stored in the field memories. As the profile pattern increases, that is, as the time durations of the line intervals are increased, horizontal start control circuit 420 advances the start time for reading from the field memories by a corresponding amount. Conversely, when the profile pattern decreases, thereby reducing the durations of the horizontal line intervals, the horizontal start control circuit delays the start time for reading from the field memories. Consequently, distortions that otherwise might appear in the video picture are compensated, particularly distortions that would be most visible in displayed vertical lines.

In the embodiment shown in FIG. 5, it has been preferred to utilize look up tables 410 and 412 to determine percentages of pixel values in accordance with the present location of the profile pattern during the vertical period adjustment operation. As an alternative, a multiplier circuit can be used, wherein the value of a pixel read from field memory 402 (or field memory 404) is multiplied by a factor which varies as the profile pattern varies. As a result, a percentage of the pixel value is produced; and this percentage may be combined with the percentage of the value of an adjacent pixel in the next line to provide a corrected pixel value.

Figure 6:
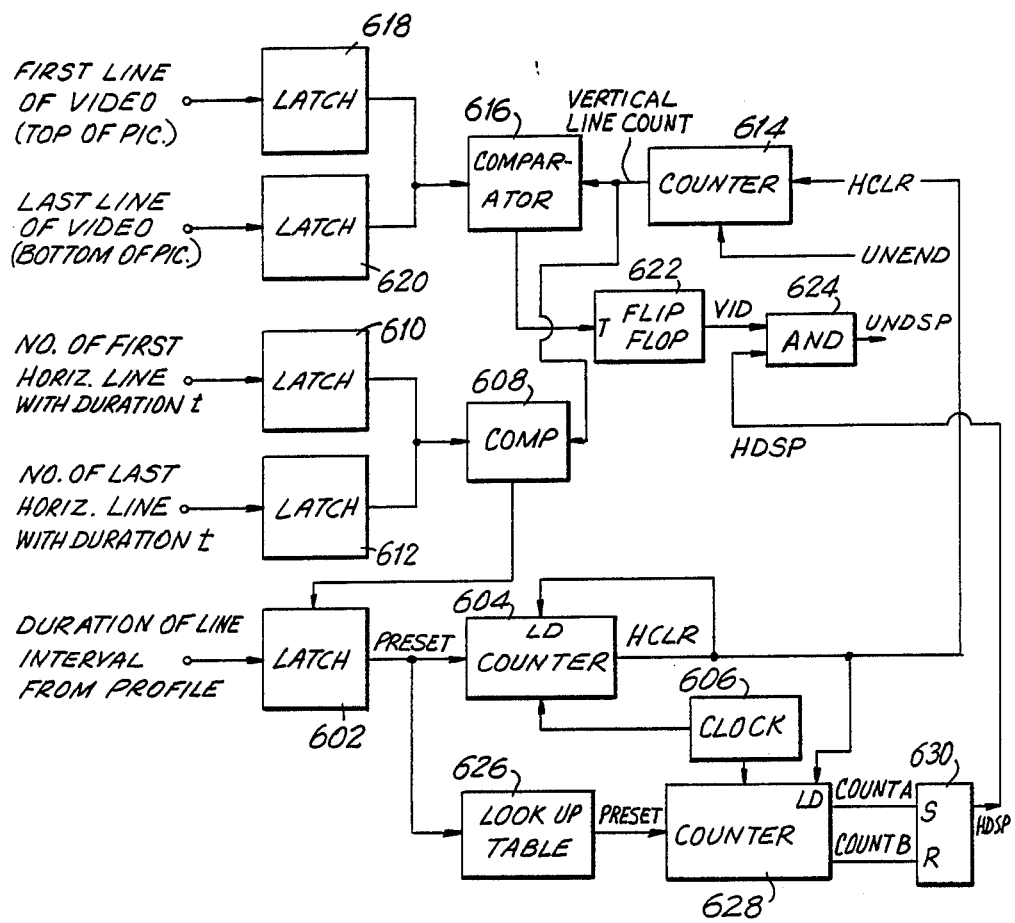
FIG. 6 is a block diagram of the electronics used to generate various timing signals for controlling frame length adjustments.

Referring now to FIG. 6, there is illustrated a block diagram of apparatus used to control the reading out of memory 104 (or the reading out of field memories 416 and 418) by which the vertical period is adjusted by changing the durations of the horizontal line intervals included in the frames. The apparatus includes a latch circuit 602, a counter 604, latch circuits 610 and 612, a counter 614, a comparator 608, latch circuits 618 and 620 and a comparator 616. Latch circuit 602 is adapted to receive data representing the duration of a line interval, as determined by the profile pattern. This data may be derived directly from the profile data and, as an example, may represent a line duration within the range of 62.10 microseconds to 65.03 microseconds. Latch circuit 602 is coupled to counter 604 and is adapted to preset the counter to a count representing the profile-determined duration of the line interval.

Counter 604 is coupled to a clock circuit 606 which, as a numerical example, may generate clock pulses of a frequency 120 MHz. Counter 604 is adapted to be decremented in response to the clock pulses to produce an output pulse HCLR, representing the end of the line interval whose duration is represented by the count to which the counter has been preset. The output of counter 604 is coupled to counter 614, and the pulses HCLR are supplied to counter 614 as clock pulses.

Latch circuit 610 is adapted to store therein the number of the first line interval whose duration is t. Latch circuit 612 is adapted to store the number of the last line interval having this duration t. It will be appreciated that the duration t is equal to the duration supplied to latch circuit 602. The outputs of latch circuits 610 and 612 are coupled to one input of comparator 608, and the comparator includes another input coupled to the output of counter 614. An output of comparator 608 is coupled to latch circuit 602 and functions as an enable, or load, input.

Latch circuit 618 is adapted to receive and store data representing the delay or advance (Δt) for reading out the line interval which constitutes the first viewable line of the video picture (e.g. line #21). From the foregoing discussion of FIGS. 3A–3C, it is appreciated that, depending upon the increase or decrease in the vertical period, the read-out time of the line (e.g. line #21) which constitutes the top of the video picture may vary. In the above-discussed example, the first line of the video picture has been assumed to be line 21 for "standard" vertical periods, and the read-out time of line #21 is delayed for increased vertical periods and is advanced for decreased vertical periods.

Latch circuit 620 is adapted to receive data representing the number of the bottom-most viewable line of the video picture, typically line #241. The latch circuits are coupled to one input of comparator 616, and this comparator includes another input coupled to counter 614. The output of comparator 616 is coupled to a flip-flop circuit 622 which, as will be described, toggles between set and reset states in response to the output of the comparator. The output of flip-flop circuit 622, for example, the SET output thereof, is coupled to one input of an AND gate 624 whose other input is coupled to a flip-flop circuit 630 to receive a rectangular signal, designated HDSP, which coincides with the active portion of a horizontal line interval.

A look up table 626 is coupled to latch circuit 602 to receive as an address the data representing the duration of a line interval, as determined by the profile pattern. Look up table 626 stores count numbers representing different line interval durations. A particular duration count is read from the look up table to a counter 628 to preset that counter. Counter 628 is coupled to clock circuit 606 and, in accordance with one example described herein, is adapted to decrement its count in response to each clock pulse supplied thereto. The counter includes "count A" and "count B" outputs coupled to the set and reset inputs, respectively, of flip-flop circuit 630.

Figure 7:
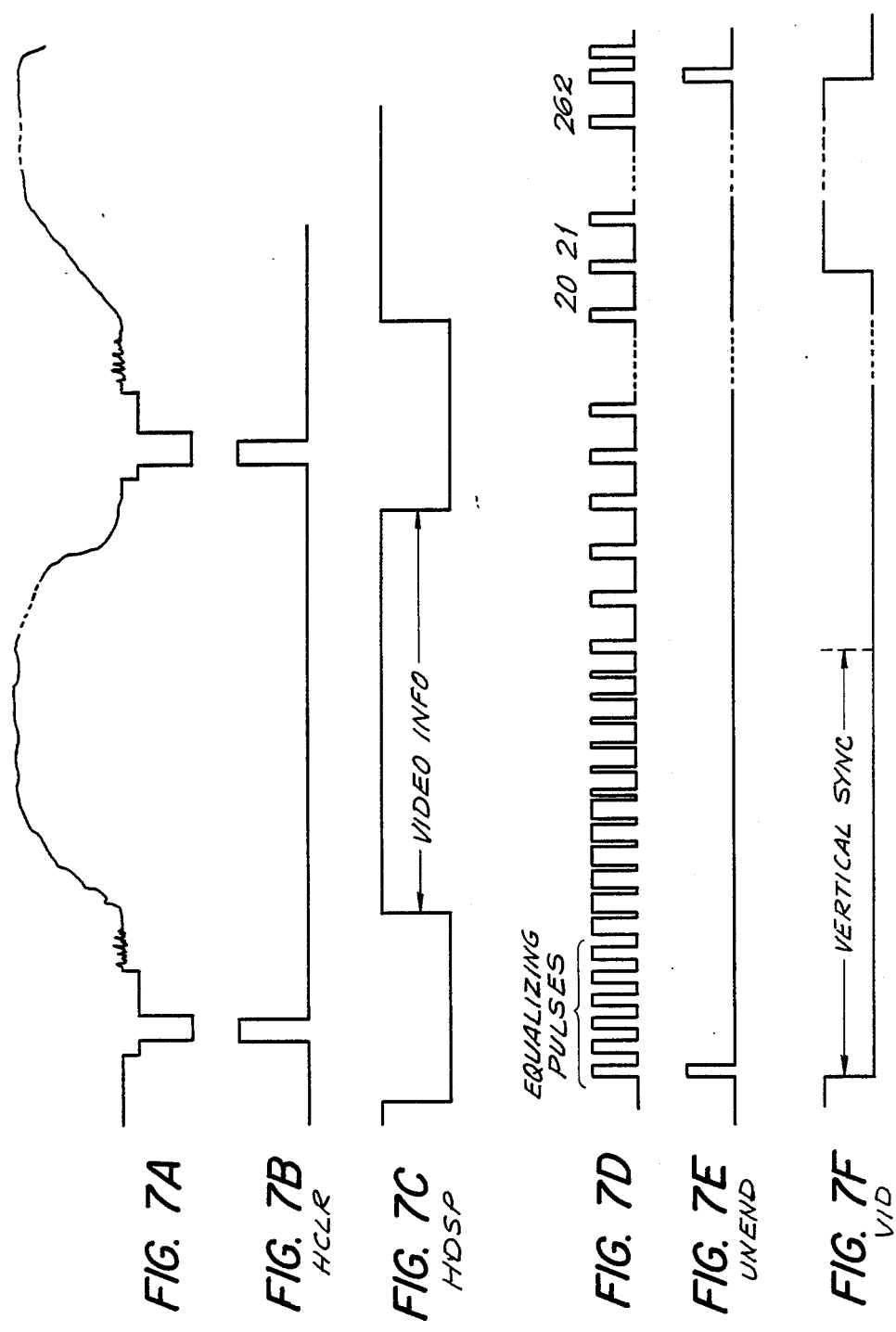
FIGS. 7A-7F are waveform diagrams which are useful in understanding the operation of the electronics shown in FIG. 6.

The manner in which the timing circuit illustrated in FIG. 6 operates now will be described in conjunction with the waveforms shown in FIGS. 7A–7F. FIG. 7A represents the horizontal line intervals of a typical television signal, including a horizontal synchronizing pulse, a burst signal and active video information. It is appreciated that the separation of the horizontal synchronizing pulses increases if the duration of the line interval increases and, conversely, the separation between horizontal synchronizing pulses decreases as the duration of the line interval decreases.

The duration of the line interval being read from memory 104 (or from field memories 416 and 418) is supplied to and stored in latch circuit 602. The data supplied to all of the illustrated latch circuits may be provided by processor 110 (FIG. 1).

Counter 604 is preset to a count corresponding to this profile-determined duration, and the count is decremented in response to the clock pulses supplied to counter 604 by clock circuit 606. As an example, counter 604 may be preset to a count of 7625 when the duration of the line interval being read from the memory is the standard duration (e. g. approximately 63.56 microseconds). The counter may be preset to a count of 7450 when the duration of the line interval is to be, for example, 62.10 microseconds, and the counter may be preset to a count of 7800 when the duration of the line interval is to be, for example, 65.03 microseconds. It is appreciated that, as the preset count of counter 604 increases, the period required for the counter to be fully decremented likewise increases.

Counter 604 produces the pulse HCLR, shown in FIG. 7B, when it is fully decremented. At that time, the HCLR pulse is used as a load pulse to load the counter with a preset count received from latch circuit 602 and representing the duration of the next line interval to be read from the memory. This HCLR pulse also is supplied to counter 614 whereat it is counted, and the HCLR pulse also functions as a load pulse to load counter 628 with a count read from look up table 626 in response to data representing the duration of the next line interval, as received from latch circuit 602.

Counter 614 initially is reset by a pulse UNEND which, as one example, may be generated upon detecting the first set of equalizing pulses normally included in a field of the television signal. FIG. 7D represents these equalizing pulses, together with the usual set of vertical synchronizing pulses, followed by another set of equalizing pulses and horizontal blanking pulses normally provided in the vertical blanking interval of a television signal. FIG. 7D also illustrates typical horizontal synchronizing pulses included in, for example, line intervals 20-262 of a typical field. FIG. 7E represents the UNEND pulses which generally coincide with the beginning of the first set of equalizing pulses included in a field. As an alternative, it will be appreciated that the UNEND pulses may be generated by counter 614 after a predetermined number of HCLR pulses (e. g. 262 or 263 HCLR pulses) have been counted.

The count of counter 614 represents the number of the line interval being read from the memory. Stated otherwise, the count of counter 614 represents the vertical line count. This vertical line count is compared by comparator 608 to a count stored in latch circuit 610 representing the number of the first line interval having the duration represented by the data stored in latch circuit 602. It is recalled that, preferably, a set of twenty-five line intervals is provided with the same duration, and the number of the twenty-fifth line interval is supplied to latch circuit 612. When this last line interval having the duration represented by the data stored in latch circuit 602 is reached, comparator 608 produces an output to enable latch circuit 602 to store data representing the duration of each line interval included in the next set of twenty-five line intervals. From the foregoing discussion, it is appreciated that the duration t changes from one set of twenty-five line intervals to the next set by approximately 8 nanoseconds. Thus, the data stored in latch circuit 602 will increase or decrease by 8 nanoseconds at each latch-load cycle.

The vertical line count produced by counter 614 is compared by comparator 616 to a count representing the top viewable line of the video picture, as stored in latch circuit 618 (e.g. line #21), and also to a count representing the bottom viewable line of that video picture, as stored in latch circuit 620 (e.g. line #241). When the vertical line is equal to the top line, for example, when the vertical line count is equal to line 21, comparator 616 sets flip-flop circuit 622 which subsequently is reset when the vertical line count is equal to the last line of the video picture, for example, when it is equal to line 241. FIG. 7F represents the output of flip-flop circuit 622. The negative portion of the illustrated rectangular waveform coincides with the vertical synchronizing interval included in a field of the television signal, and the positive portion of this rectangular waveform represents the viewable portion of the television signal.

Counter 628 is preset in response to each HCLR pulse to a count read from look up table 626 which, in turn, is determined by the duration of the line interval being read from the memory, as represented by the data stored in latch circuit 602. Counter 628 counts the clock pulses supplied by clock generator 606, and when a first count, identified as count A, is reached, counter 628 applies a signal to flip-flop circuit 630 to set this flip-flop circuit. As a result, the flip-flop circuit produces the output signal HDSP, shown in FIG. 7C. Counter 628 continues to count the clock pulses supplied thereto; and when count B is reached, flip-flop circuit 630 is reset. From FIG. 7C, it is seen that signal HDSP is of a rectangular waveform whose positive portion coincides with the useful video information provided in a horizontal line interval. The delay between pulse HCLR and the positive portion of signal HDSP is a function of the count to which counter 628 is preset; and this, in turn, corresponds to the start read time and is determined by the profile pattern.

Signal HDSP is combined with the output VID from flip-flop circuit 622 in AND gate 624. The AND gate produces a series of pulses each of a width equal to the positive portion of the signal HDSP, and the period of the output signal UNDSP from AND gate 624 is defined by the positive portion of the signal VID (FIG. 7F). The signal UNDSP is used to enable the read-out cycle of the memory.

Figure 8:
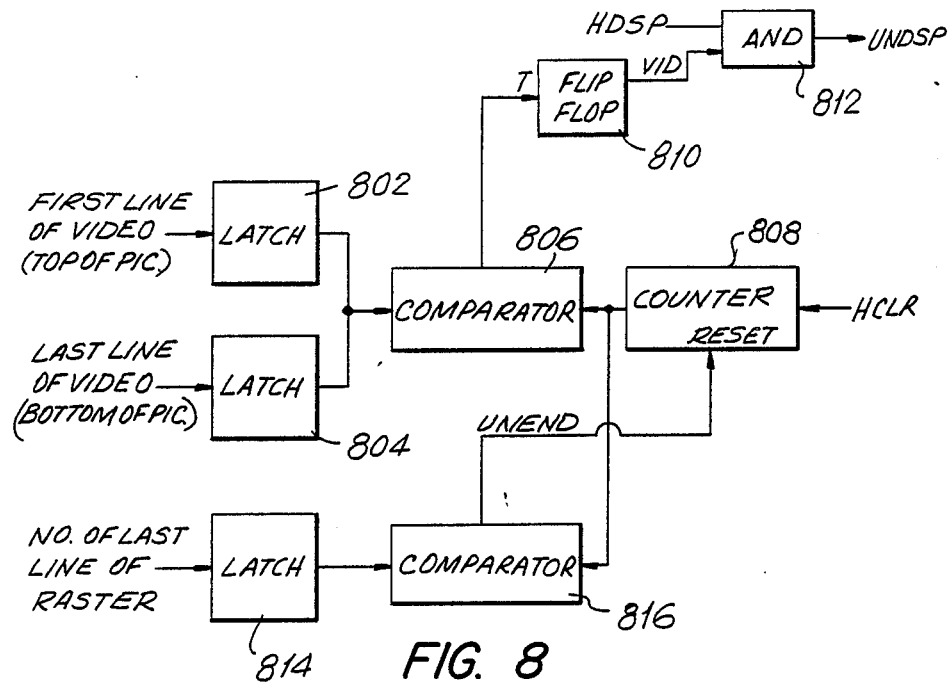
FIG. 8 is a block diagram of electronics used to adjust frame lengths in accordance with another embodiment of the present invention.

Whereas FIG. 6 is a block diagram of timing circuitry used to enable the read-out operation of the memory when the vertical period is changed by varying the durations of the horizontal line intervals, FIG. 8 is a block diagram of timing circuitry used to enable the memory read operation when the vertical period is adjusted by adding or deleting lines from a field. The timing circuitry illustrated in FIG. 8 includes latch circuits 802, 804 and 814, comparators 806 and 816, counter 808, flip-flop circuit 810 and an AND gate 812. Latch circuits 802 and 804 are similar to latch circuits 618 and 620 and are adapted to store the line counts identifying the top line and bottom line, respectively, of the displayed video picture.

Latch circuits 802 and 804 are coupled to comparator 806 which, in turn, is coupled to counter 808, the latter being adapted to count HCLR pulses of the type shown in FIG. 7B. The output of comparator 806 is coupled to flip-flop circuit 810 whose output is, in turn, coupled to AND gate 812. It is appreciated that the combination of latch circuits 802 and 804, comparator 806, counter 808, flip-flop circuit 810 and AND gate 812 are similar to and perform substantially the same function as latch circuits 618 and 620, comparator 616, counter 614, flip-flop circuit 622 and AND gate 624, described above in connection with FIG. 6.

The output of counter 808 also is coupled to comparator 816 which is adapted to compare the count of this counter with a line number count stored in latch circuit 814. This line number count identifies the last raster line in a video picture read out from the memory (e.g. line #241). It is appreciated that the same number of active video lines (e.g. 220 lines) is read from the memory, whether the vertical period is increased or decreased. Of course, the number of "black" line intervals that precede and follow the active line intervals is modified, as determined by processor 110 which controls synchronizing signal generator 116 accordingly, (FIG. 1).

The HCLR pulses supplied to counter 808 may be derived from the actual horizontal synchronizing pulses included in the video signal or, alternatively, a counter similar to counter 604 may be used to generate the HCLR pulse periodically. In this instance, since the duration of each line interval is fixed at the standard duration of 63.56 microseconds, there is no need to modify the count to which the counter would be preset.

Counter 808 is similar to counter 614 in that the count produced thereby represents the vertical line count. As successive line intervals are read from the memory, counter 808 is incremented. When the vertical line count reaches the number of the last active line included in the field, comparator 816 produces an UNEND output to reset the counter.

Comparator 806 toggles flip-flop circuit 810 to produce the VID signal shown in FIG. 7F, and this VID signal is combined with the HDSP signal (FIG. 7C) to produce the UNDSP signal. As mentioned above, signal UNDSP enables the read operation of the memory.

As described herein, the present invention controls the vertical period of a television signal either by adjusting the duration of the horizontal line intervals included in each field of the television signal or by adding or deleting line intervals from the field. The modified television signal whose vertical period thus is changed may be transmitted directly via conventional "over-the-air" broadcasting techniques, by cable techniques or by subscription television techniques. A television receiver which is supplied with this modified television signal nevertheless is able to display an adequate video picture in response thereto. However, if this modified television signal is recorded by conventional VTR's, the change in vertical period inhibits those VTR's from accurately recording and reproducing the television signal, thus preventing an adequate video picture from being reproduced. The modified television signal thus may be thought of as a viewable but non-recordable video signal.

The present invention also may be used in a subscription television distribution network of the type shown in FIG. 9. Typically, television signals are distributed to subscribers by way of, for example, cable, in an encoded or scrambled format. When such a subscription television distribution network is used with the present invention, it is preferred to supply to the cable distribution site, also known as the head end, a television signal having standard vertical intervals but including data which represents the profile pattern to be used at the head end for changing the vertical intervals in the manner described above. Of course, if desired, the television signal supplied to the head end may be modified by having its vertical period varied in the manner discussed above (i.e. the television signal will exhibit non-standard vertical intervals).

In addition, it is desirable that so-called "fingerprint" indicia be added to the television signal at the head end so that if an unauthorized copy somehow is made, that copy will include the "fingerprint" which, typically, identifies the time of transmission, the cable distribution site and the operator of that site. Of course, final encoding or scrambling of the television signal is effected at the cable distribution site.

Figure 10:
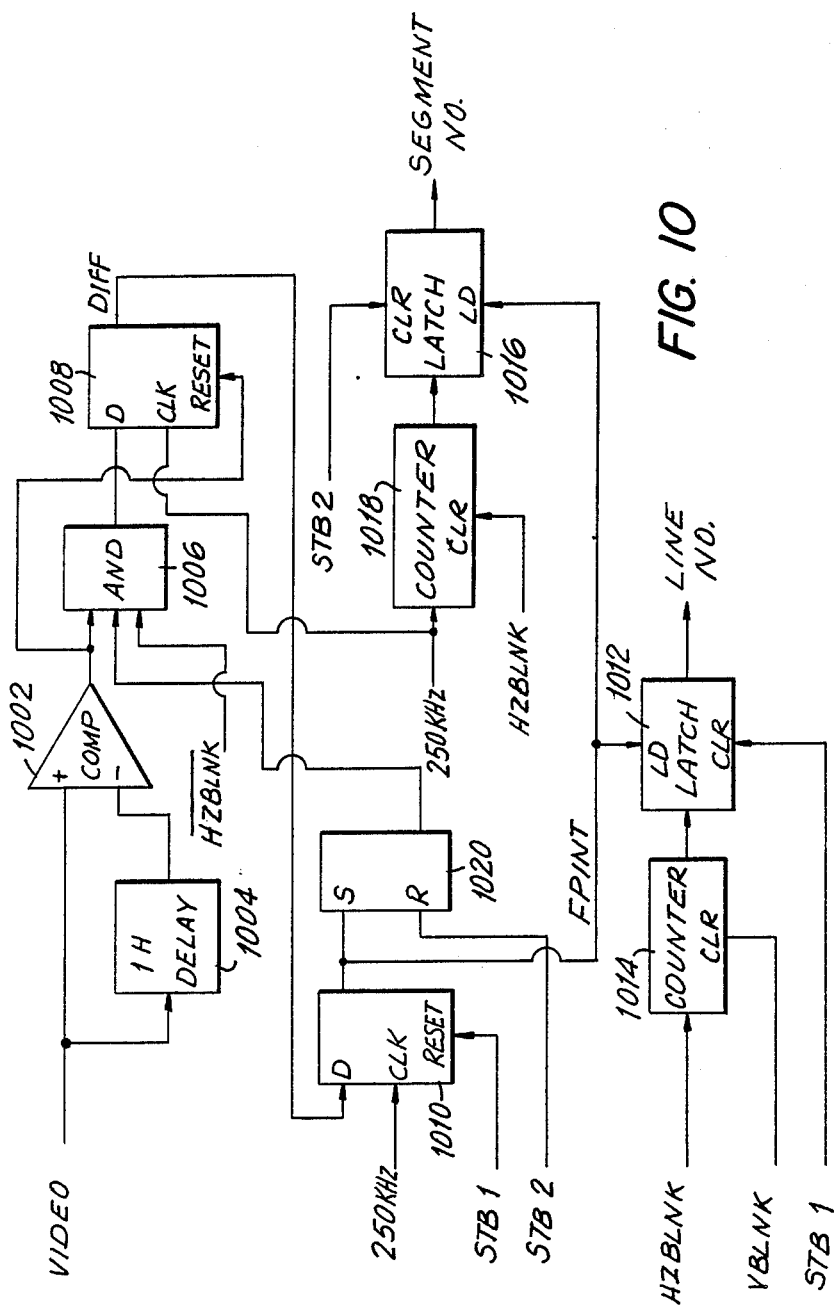
FIG. 10 is a logic diagram representing the manner in which "fingerprint" information may be provided in the system shown in FIG. 9 to detect misappropriation of the television signal transmitted via the subscription system.

When the present invention is used in the subscription television network shown in FIG. 9, the source of the television signal, that is, the television programming, preferably is reproduced from a prepared video tape by a VTR 902. The television signal reproduced from the VTR is supplied to a scene change detector and a fingerprint location detector 904. The scene change detector has been described above; and the fingerprint location detector is adapted to sense a location in the television signal at which fingerprint data should be inserted prior to distribution to subscribers. One embodiment of a fingerprint location detector which may be included in subsystem 904 is illustrated in FIG. 10. Essentially, the fingerprint location detector senses a substantial modification in the video signal of one line with respect to the next-following line in a field. It has been found that if fingerprint data, typically, a single bit, is inserted into the active video signal at this location, its presence is not perceived in the video picture. The fingerprint location detector functions to determine this location.

Scene change detector and fingerprint location detector 904 supply signals to produce a video and time code record 906. The video and time code record may comprise a video recording in which both the composite television signals and the time codes which identify the respective frames in the composite television signals are recorded.

In addition, a record, such as a magnetic disk, is made of the particular frames in which scene changes are detected and proper locations for insertion of fingerprint data are found. This record preferably is comprised of time code data to identify the frame in which a scene change occurs, and also a numerical count to identify the particular horizontal line interval and segment of that line interval in which fingerprint data may be inserted.

A controller 910 responds to the video time code record 906 and also to the scene change time code and fingerprint location 908 to select a profile pattern, as discussed above. In addition, any geometric correction that may be needed in the video signal, such as the geometric correction discussed with reference to FIG. 5, also is made by controller 910. Still further, the composite television signal, which has not yet been subjected to vertical period adjustments, may be transmitted to the aforementioned head end at the cable distribution site in scrambled format. Such scrambling provides security against unauthorized reception of the composite television signal which, but for the scrambling, would be in condition to be recorded and reproduced. One preferred technique for scrambling the composite television signal is to rearrange the line intervals in each field. Of course, information identifying the rearrangement, that is, a so-called "scramble map" is produced; and this scramble map, together with profile data representing the selected profile pattern and fingerprint location data are inserted into any suitable location of the television signal, such as the vertical blanking interval (VBI). It is recognized that several line intervals included in the VBI are not used for useful information; and it is convenient to insert the profile data, scramble map and fingerprint location data in one or more of these VBI line intervals. Preferably, the profile data, scramble map and fingerprint location data (referred to, for simplification, merely as VBI data) are encrypted prior to insertion. In one embodiment, a conventional DES encryption technique may be used. Finally, controller 910 scrambles the television signal in accordance with the scramble map inserted into the VBI. Of course, this data may be inserted into other locations of the television signal, such as is the horizontal blanking intervals, one bit of data at a time.

The output of controller 910 is represented as video, VBI data and time code 912. The time code information represents the location of each frame in the scrambled television signal; and at this stage in the signal processing, the VBI data is comprised of the aforementioned encrypted profile data, scramble map and fingerprint location data. In one embodiment, a scrambled master distribution tape containing video, time code and VBI data is prepared. This master video tape may be physically delivered to a VTR 918 located at the head end of the cable distribution site or, alternatively, information recorded on the scrambled master distribution tape simply may be reproduced and transmitted, such as via satellite transmission, from the location of controller 910 to the head end at the cable distribution site. Conventional uplink 914 and downlink 916 are provided to accommodate such satellite transmission.

At head end 920, vertical period adjustments to the composite television signal are made, in accordance with the present invention. Of course, as mentioned previously, such vertical period adjustments may be made prior to receipt of the television signal by the head end. In addition, the scrambled video signal is descrambled in accordance with the scramble data map which, in turn, is decrypted and used to control the descrambling operation. Furthermore, the fingerprint location data encrypted prior to insertion into the television signal, also is decrypted and used to identify the proper locations in the video signal in which suitable fingerprint data may be inserted. It is expected that the resultant, modified television signal (i.e. the television signal whose vertical period has been changed in accordance with the present invention) then is encoded in accordance with the encoding technique adopted by the cable distribution network. The encoded television signal, containing fingerprint data and having its vertical period modified as aforementioned then is transmitted via the cable distribution network. Alternatively, the encoded, modified composite television signal may be transmitted by other means to an electronic theater.

Figure 11:
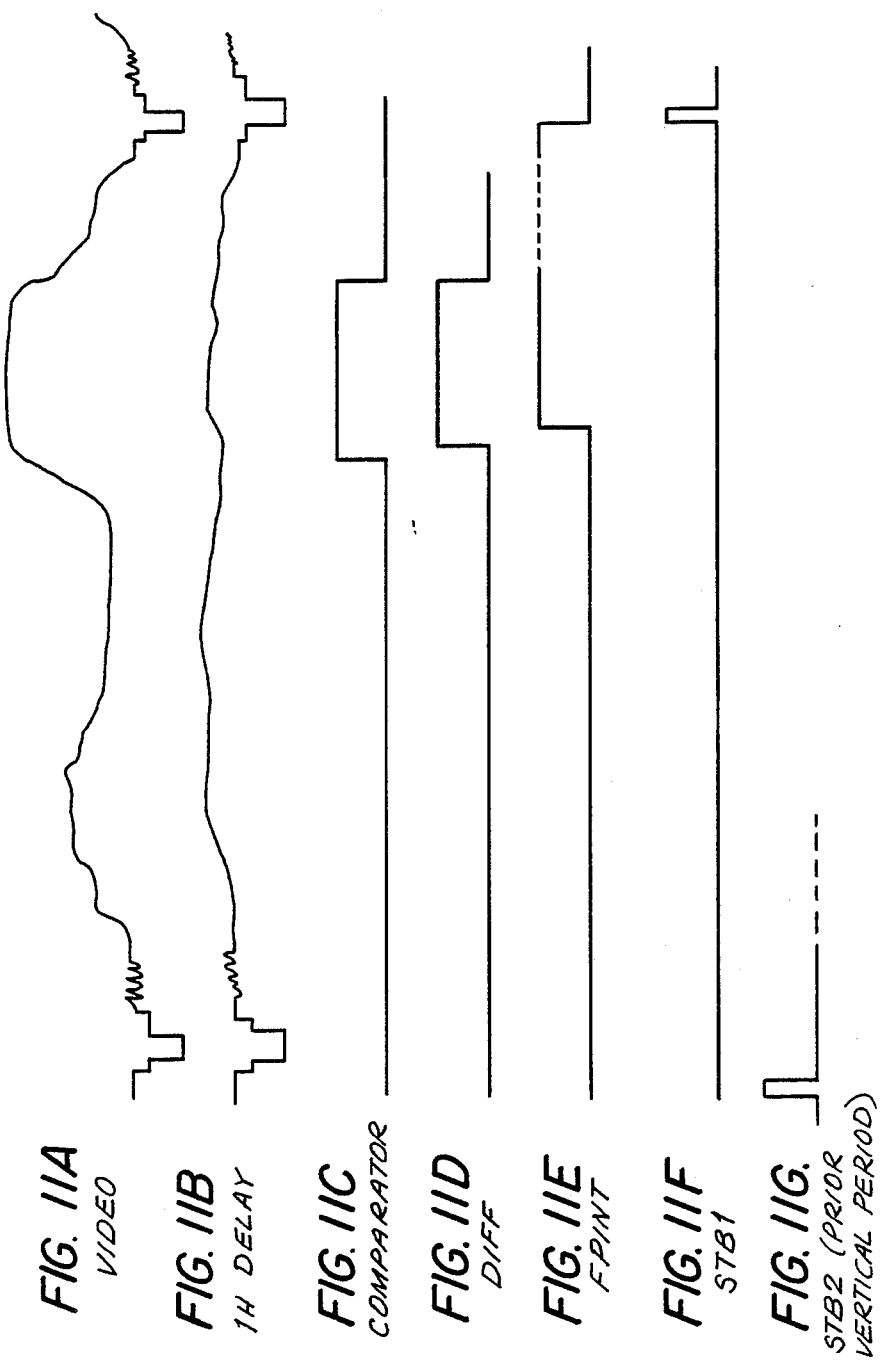
FIGS. 11A-11G are waveform diagrams which are useful in understanding the operation of FIG. 10.

Referring to FIG. 10, a logic diagram representing the manner in which the fingerprint location is detected is illustrated. As mentioned above, fingerprint data is inserted into the active video portion of a television signal at a location in a field whereat a sudden change in video characteristics from one line to the next occurs. Comparator 1002 and delay circuit 1004 detects a sudden increase in, for example, luminance level. The comparator is supplied with the incoming video signal at one input thereof and also as supplied with the preceding line of that video signal via delay circuit 1004, identified as a 1H delay circuit. It is seen that delay circuit 1004 delays the incoming video signal by a duration equal to a horizonal line interval. Although not shown, an attenuator may be used to supply the incoming video signal to comparator 1002 such that an output is produced by the comparator only if the incoming video signal exceeds the delayed version of that video signal by a factor equal to the attenuation factor. In one embodiment, this attenuation factor is on the order of about 4. Alternatively an amplifier may be used to amplify the delayed video signal supplied to the comparator. In any event, the video and delayed video signals supplied to the comparator may be as illustrated in FIGS. 11A and 11B, wherein FIG. 11A represents a sudden increase in the luminance level in the field interval presently being received. FIG. 11C illustrates the output of comparator 1002.

Preferably, only one location in a field interval has fingerprint data inserted thereinto. AND gate 1006 is coupled to comparator 1002 to make certain that the output of the comparator is gated only once during a field interval. As will be explained, a flip-flop circuit 1020 is reset by a strobe pulse STB2, produced by, for example, a microprocessor, at the end of a field interval. The flip-flop circuit thus remains reset only until comparator 1002 produces its output (FIG. 11C) and then the flip-flop circuit is set at a suitable delayed time thereafter. AND gate 1006 is conditioned to pass the output of comparator 1002 when flip-flop circuit 1020 exhibits its reset state.

Another constraint on detecting the location at which fingerprint data is to be inserted is that this location should not be present during the horizontal blanking interval. Accordingly, end gate 1006 is provided with an inverted version of a horizontal blanking pulse such that the AND gate is inhibited during horizontal blanking intervals.

The output of comparator 1002 is used to initially reset a flip-flop circuit 1008, and the output of AND gate 1006 triggers this flip-flop circuit to its set state in coincidence with a clock pulse supplied to a clock input of the flip-flop circuit by a suitable clock generator. In the illustrated embodiment, clock pulses on the order of 250 KHz are supplied to flip-flop circuit 1008. As is also shown, this flip-flop circuit preferably comprises a D-type flip-flop, with the output of AND gate 1006 coupled to the data input D thereof. It is recognized that, by reason of the timing of the 250 KHz clock pulses, flip-flop circuit 1008 always will be reset in response to the output of comparator 1002 just slightly in advance of being set by this same output as passed through AND gate 1006. The output signal, designated DIFF, produced by flip-flop circuit 1008 is illustrated in FIG. 11D.

This DIFF signal is supplied to a flip-flop circuit 1010 which normally is in its reset state awaiting this DIFF signal. In the illustrated embodiment, flip-flop circuit 1010 comprises a D-type flip-flop, with the DIFF signal supplied to the data input D and with 250 KHz clock pulses supplied to the clock input thereof. FIG. 11E illustrates the output of flip-flop circuit 1010, and it is seen that the output signal produced by this flip-flop circuit, designated fingerprint location FPINT, is delayed relative to the DIFF signal. It will be appreciated that this delay is equal to a cycle of the 250 KHz clock pulse.

Also not shown, the FPINT signal is supplied to the microprocessor mentioned above, and in response to this FPINT signal, the microprocessor returns a strobe signal STB1 to reset the flip-flop circuit. FIG. 11F illustrates the relative timing of this strobe signal STB1, and in one embodiment, the microprocessor returns the strobe signal STB1 at the completion of the line interval in which the FPINT signal is produced. Thus, flip-flop circuit 1010 will be reset to await the occurrence of the next DIFF signal.

As also shown in FIG. 10, the FPINT signal sets flip-flop circuit 1020, thereby inhibiting AND gate 1006 until the flip-flop circuit next is reset. Consequently, one and only one output of comparator 1002 is passed by the AND gate, notwithstanding the possibility that several successive outputs may be produced by the comparator during a field interval. Of course, and as mentioned above, flip-flop circuit 1020 is reset by the STB2 pulse produced by the microprocessor at the end of the field interval in which the FPINT signal had been produced. Thus, flip-flop circuit 1020 may be set once and only once during a field interval.

The FPINT signal produced by flip-flop circuit 1010 is coupled to the load input of a latch circuit 1012 to enable the latch circuit to receive and store the contents of counter 1014 coupled thereto. Counter 1014 counts horizontal blanking pulses HZBLNK and, thus, the count of this counter identifies the number of the horizontal line interval then being received. As illustrated, the counter is cleared, or reset, in response to the vertical blanking pulse normally produced once during each field interval. Accordingly, latch circuit 1012 stores therein the number of the horizontal line interval in which the FPINT signal is produced. This is used to identify the number of the line interval in which fingerprint data is to be inserted. This line number is supplied to the microprocessor, and the microprocessor clears the latch circuit by supplying signal STB1 thereto, thereby conditioning the latch circuit to store the line number of the horizontal line interval in the next field interval at which fingerprint data is to be inserted.

Similarly, the FPINT signal is supplied to the load input of latch circuit 1016 to enable this latch circuit to store therein the count then reached by counter 1018. Counter 1018 is cleared, or reset, at the beginning of each horizontal line interval in response to the horizontal blanking pulse HZBLNK. The counter then counts the 250 KHz clock pulses to provide a count representing a particular location or segment of a line interval. As an example, fifteen of these clock pulses may be produced during each horizontal line interval, and the count reached by counter 1018 at the time that the FPINT signal is produced represents that segmented location in the line interval (whose number was identified by the count now stored in latch circuit 1012) at which fingerprint data may be inserted. Thus, the counts stored in latch circuits 1012 and 1016 identify the particular line interval in a field interval and also the segment in that line interval at which fingerprint data is to be inserted. As shown in FIG. 9, this data representing the insert location for fingerprint data is stored for subsequent introduction into the VBI data.

Figure 12:
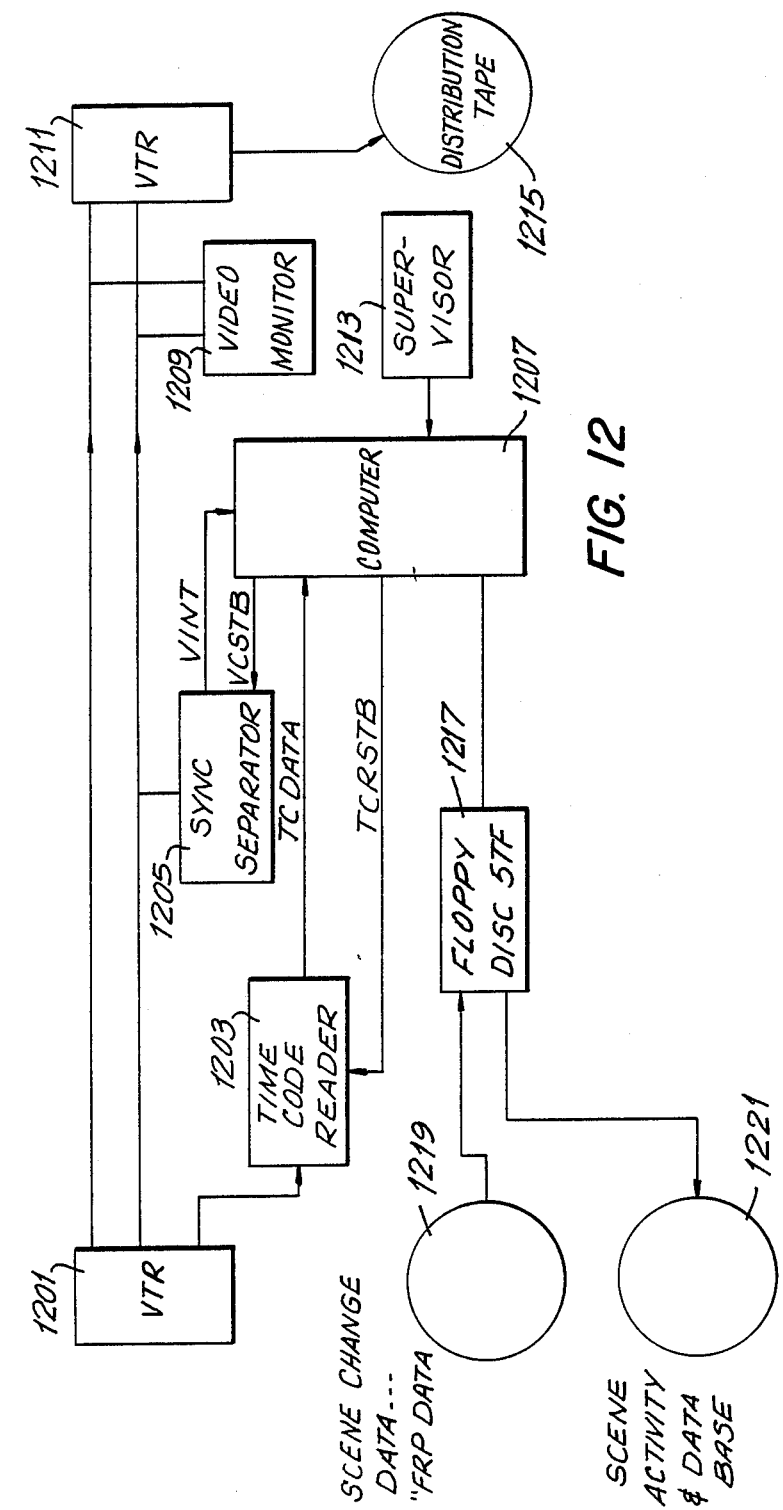
FIG. 12 is a block diagram showing in greater detail a portion of the system shown in FIG. 9.

FIG. 12 is a functional block diagram of controller 910 shown in FIG. 9. The apparatus of FIG. 12 includes a VTR 1201 for reproducing the video signal whose vertical period is to be modified in accordance with the present invention and which will be scrambled prior to transmission or other delivery to the cable distribution site. The locations in each vertical interval of this video signal at which fingerprint data is to be inserted also is identified.

The video signal is played back by VTR 1201 while being re-recorded on VTR 1211 and monitored on a video monitor 1209 by a supervisor 1213. This playback and monitoring operation is used to select appropriate profile patterns which best fit this video signal (as discussed above), and profile data representing such profile patterns is inserted into the VBI data. Accordingly, as a video signal is played back by VTR 1201, time code reader 1203 supplies to a computer 1207 time codes representing each of the played back frames. Also, a synchronizing signal separator 1205 detects the vertical interval and supplies data to the computer corresponding thereto. It is recalled that the particular frames in which scene changes occurred had been determined by scene change detector 904 (FIG. 9), and the location in each field in which fingerprint data may be inserted also have been detected. Such frame identifications of scene change and fingerprint locations are stored on, for example, a magnetic disk 1219, and this stored information is supplied by a disk interface 1217 to computer 1207. The computer now utilizes the previously obtained scene change and fingerprint location data with the time code information supplied by time code reader 1203 to produce a record for every vertical blanking interval. This record identifies the particular location of the profile pattern for each frame reproduced by VTR 1201 (and identified by time code reader 1203) and also identifies the number of the line interval in the field interval and segment of that line in which fingerprint data may be inserted. Still further, computer 1207 generates a scramble map (discussed above) to identify the particular scramble rearrangement that will be used for a field. Thus, computer 1207 generates for each field of the video signal, the following information profile data representing the vertical period for that field in accordance with the present location along the profile pattern, fingerprint location data and scramble mapping data. This information is stored in suitable data record format and is arranged as a VBI data record for insertion into predetermined locations of the television signal (such as the vertical blanking interval in each field). Advantageously, all of this VBI data is encrypted such as in accordance with a DES encryption code, described above, ad the encrypted VBI data is inserted into the video signal. This video signal containing the encrypted VBI data is recorded on VTR 1211 and distributed, either by physically transporting the recorded tape to the cable network distribution site or playing back this recorded tape for reception at the cable network distribution site.

FIGS. 13A–13C represent the vertical blanking interval and VBI data inserted thereinto, in accordance with a preferred embodiment. As mentioned previously, one technique that may be used to scramble the video data is to randomly rearrange groups of lines of a field interval. For example, if 240 active lines in a field are contained in the viewable portion, or raster, of the video picture, these 240 lines are broken up into, for example, 4 different blocks, each block of a different length. As a numerical example, one block may be formed of 8 line intervals, another block may be formed of 150 line intervals, yet another may be formed of 45 line intervals and the last block may be formed of 37 line intervals. These blocks of different lengths are rearranged, thus resulting in a scrambled television signal. Continuing with this numerical example, let it be assumed that a field memory is formed of at least 256 rows, each row being adapted to store a line interval and of course, there will be extra "spare" rows in the field memory.

Consistent with the numerical example discussed above, to scramble the television signal, the first block of 8 line intervals is stored in, for example, memory rows 141–148. The second block of 150 line intervals is stored in memory rows 186–335. The third block of 45 line intervals is stored in memory rows 95–140 and the fourth block of 37 line intervals is stored in memory rows 149–185. If the memory rows are read out in sequential order, the television signal is scrambled because blocks 1, 2, 3 and 4 would be transmitted as blocks 3, 1, 4 and 2, respectively.

FIG. 13A is a waveform diagram representing a typical vertical blanking interval included in a field interval of an NTSC television signal. As shown, the vertical blanking interval includes a first set of equalizing pulses followed by a set of vertical synchronizing pulses followed by another set of equalizing pulses. Then, a number of "blank" field intervals follows and these "intervals" are, in turn, followed by line intervals containing active video information. Two available line intervals included in the vertical blanking interval are used to store the VBI data. FIGS. 13B and 13C represent these two line intervals which, as an example, may be any desired line intervals between lines 10 and 20 in the field interval.

FIG. 13B represents six bytes of VBI data representing the scramble map, and FIG. 13C represents six bytes of VBI data, two bytes being associated with the remainder of the scramble map, two bytes identifying the location in which fingerprint data may be inserted, one byte containing profile data and a "spare" byte. The scramble map identifies the number of line intervals included in each of the aforementioned four blocks and also the number of the first line included in each block. Stated otherwise, the scramble map identifies the number of memory rows used to store each block of scrambled line intervals, and also the number of the first row in each block. Thus, in FIG. 13B byte 0 identifies a count of 8 line intervals included in the first block, and byte 1 identifies memory row 141 as the first row in which 8 line block is stored. Byte 2 represents a count of 150 line intervals included in the second block, and byte 3 identifies memory row 186 as the first row in which this block is stored. Byte 4 represents a count of 45 line intervals, and byte 5 identifies memory row 95 as the first row in which this block is stored.

Continuing with FIG. 13C, byte 0 represents a count of 37 line intervals and byte 1 identifies memory row 149 as the first row in which this block of line intervals is stored. Byte 2 identifies the line in this field interval in which fingerprint data may be inserted, and byte 3 identifies the particular segment of this line interval in which that fingerprint data is inserted. Byte 4 contains profile data and, in accordance with the two embodiments of the present invention described herein, this byte may represent the duration of the first 20 line intervals included in this vertical field, or the byte may represent the number of lines included in the field. As byte 4 changes, the vertical period of the field interval correspondingly changes.

In one embodiment, each vertical blanking interval in each field may be provided with the VBI data shown in FIGS. 13B and 13C. In an alternative, the VBI data may be inserted into the vertical blanking interval of only the first (i.e. the odd) field of each frame. Those of ordinary in the art will appreciate other variations which may be used to accommodate the VBI data shown in FIGS. 13B and 13C.

The manner in which the VBI data that is generated by computer 1207 (FIG. 12) having the format discussed above (FIGS. 13B and 13C) is inserted into a vertical blanking interval now will be described with reference to FIG. 14. As illustrated, VBI data is inserted into a television signal by VBI data insertion circuit 1402. This circuit is supplied with a signal from VBI timing circuit 1404 to indicate the presence of the vertical blanking interval in the incoming television signal. The VBI timing circuit is supplied with horizontal synchronizing pulses, as may be recovered from the incoming television signal, to determine when the vertical blanking interval occurs. For example, the VBI timing circuit may include a simple counter for counting the horizontal synchronizing pulses.

VBI data insertion circuit 1402 is supplied with the fingerprint location data from, for example, the circuit shown in FIG. 10, profile data as may be produced by processor 110 (FIG. 1) or as may be produced by controller 910 (FIG. 9), and the scramble map as may be produced by, for example, computer 1207 (FIG. 12) and represented by the various bytes discussed above with respect to FIGS. 13B and 13C. In the embodiment shown in FIG. 14, the fingerprint location data, profile data and scramble map are extracted from data written into a field data buffer 1408 by computer 1406. Computer 1406 may be the same computer as aforementioned computer 1207 (FIG. 12) and is adapted to derive from magnetic disk 1221 the data which had been compiled previously. For example, computer 1406 may read from magnetic disk 1221 and store in field data buffer 1408 the following information: the number of each field interval (or frame), as may be determined from the time code data supplied to computer 1207 as each frame is reproduced from VTR 1201, the fingerprint location data produced by the circuitry shown in FIG. 10, a profile data corresponding to the desired profile pattern selected from profile library 118 (FIG. 1) and the scramble map consistent with a desired scramble format (e.g. the number and size of each block of line intervals to be scrambled).

The aforementioned data stored in field data buffer 1408 is compiled for each field interval of the incoming television signal. In the embodiment shown in FIG. 12, the incoming television signal is reproduced by VTR 1201, and the field data buffer thus contains the time code data, fingerprint location data, profile data and scramble map for each reproduced field (or frame).

For convenience, the fingerprint location data stored in field data buffer 1408 is supplied to a fingerprint location data buffer 1410. Also, the profile data stored in field data buffer 1408 is supplied to profile data buffer 1412. Finally, each scramble map stored in field data buffer 408 is supplied to scramble map buffer 1414. These respective buffers supply the data stored therein to VBI data insertion circuit 1402 whereat the data is assembled in the format shown in FIGS. 13B and 13C and inserted into the proper line intervals included in the vertical blanking interval of the incoming television signal.

In one embodiment, a new accumulation of data is loaded into field data buffer 1408 with each new field interval read from the VTR. In an alternative embodiment, field data buffer 1408 may include several stages adapted to store the time code data, fingerprint location data, profile data and scramble map for several field intervals, and computer 1406 may load into the field data buffer this information associated with each of those respective field intervals.

A decoder 1416 functions to separate the active video information from the incoming television signal and supplies this information to A/D converter 1418 which digitizes the video information. As an example, 900 pixels for each line interval may be produced by the A/D converter and supplied to memory 1420 for storage therein. In one embodiment, memory 1420 comprises a dual memory adapted to store odd and even fields, and thus designated a "dual" memory. As one field of digitized video information is loaded into memory 1420, a previously stored field therein may be unloaded and supplied to a D/A converter 1424 for combination in mixer 1426 with the synchronizing pulses, vertical blanking interval, black inactive line intervals and VBI data supplied by VBI data insertion circuit 1402. Memory address control 1422 selects the appropriate memory included in dual memory 1420 into which digitized line intervals are written and from which those digitized line intervals are read. Memory address control 1422 also determines the write-in and read-out rates for the dual memory which, for the embodiment shown in FIG. 14, are synchronized with the "standard" horizontal synchronizing signal. The memory address control also determines the particular rows in which the line intervals are stored, as determined by the scramble map read from scramble map buffer 1414. The output from mixer 1426, which comprises the scrambled composite television signal containing the VBI data discussed above, is recorded on VTR 1428.

VBI data insertion circuit 1402 additionally functions to encrypt the fingerprint, profile and scramble map data prior to insertion in the television signal (such as in the vertical blanking interval). As mentioned above, it is preferred to use a DES encryption key for such encoding.

Figure 14:
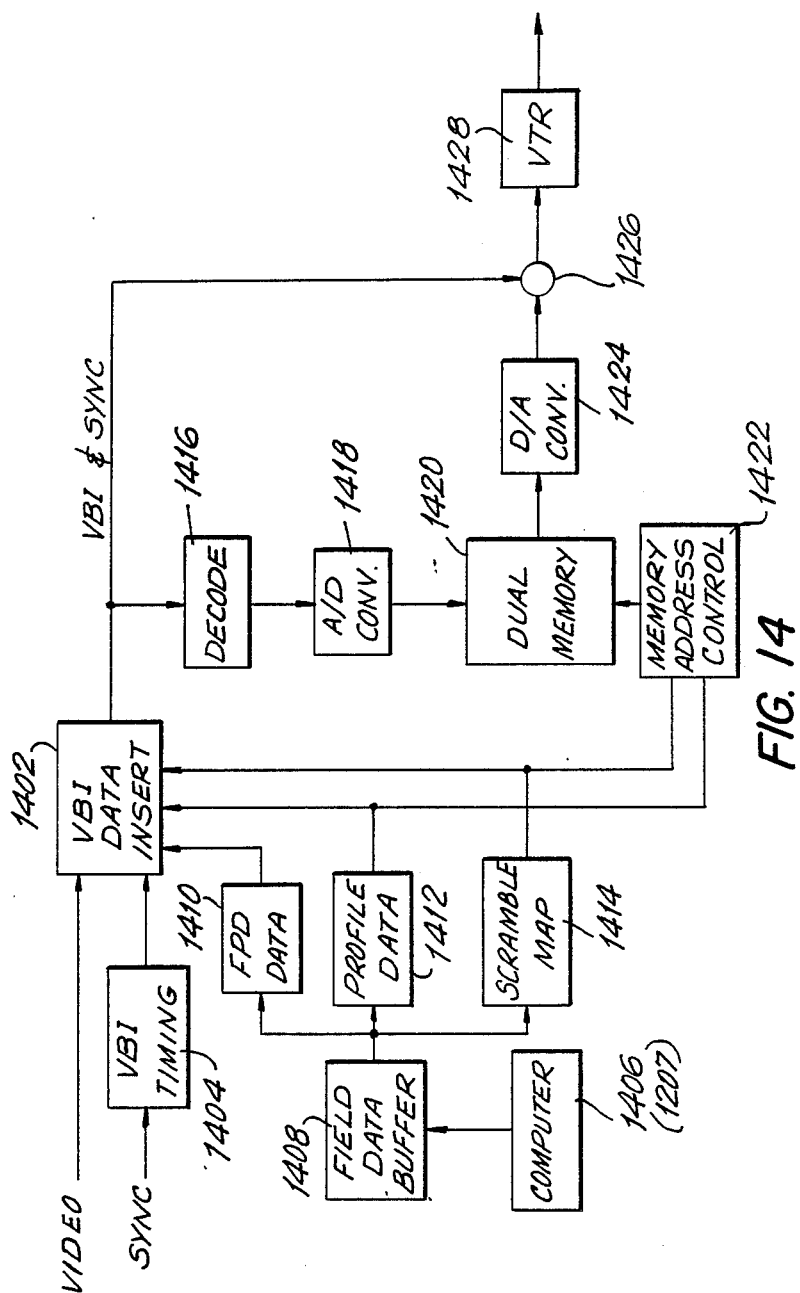
FIG. 14 is a block diagram showing in greater detail another portion of the system illustrated in FIG. 9.

In the embodiment shown in FIG. 14, the television signal recorded by VTR 1428 corresponds to the television signal provided by circuit 912 (FIG. 9). It is appreciated, therefore, that the vertical period of this television signal constitutes the standard vertical period of 16.683 milliseconds. Changes in the vertical period, that is, modification of the television signal to prevent it from being accurately reproduced if it subsequently is recorded on a conventional VTR, is carried out by the apparatus shown in FIG. 15 which, it will be appreciated, incorporates the present invention discussed previously with respect to FIGS. 1 and 5.

Figure 15:
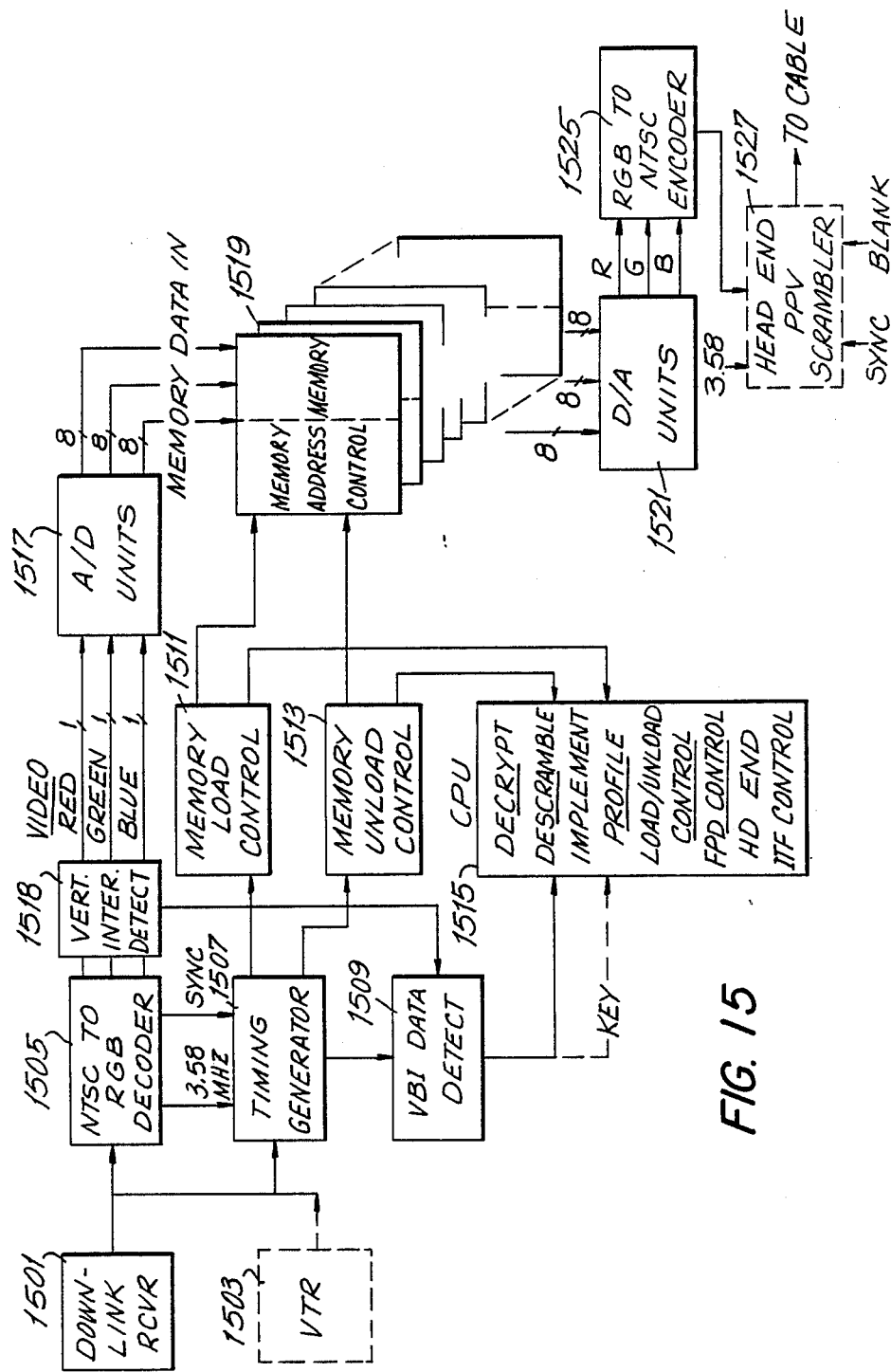
FIG. 15 represents the manner in which the present invention may be used in the system shown in FIG. 9.

The apparatus shown in FIG. 15 is located at the head end, or cable network distribution site. The purpose of this apparatus is to modify the vertical period of the television signal, as discussed in detail hereinabove, and to permit fingerprint data to be inserted into the identified location of the active video signal. An incoming television signal whose vertical blanking interval has been prepared in accordance with the apparatus shown in FIG. 14 and which has been scrambled, is received either by means of, for example, satellite transmission, or by reproducing same from a video tape (as represented by VTR 1503). In either event, the scrambled and VBI-encoded television signal is assumed to be present in NTSC format and is converted by NTSC-to-RGB decoder 1505 to separate red, green and blue video components, each component being scrambled as aforesaid.

The usual 3.58 MHz color subcarrier burst signal and horizontal synchronizing signals are recovered from the incoming television signal, and the subcarrier and horizontal synchronizing signals are supplied to timing generator 1507 whereat suitable timing pulses re generated to control the timing of portions of the remaining illustrated circuitry. As an example, a timing signal frequency of six times the color subcarrier frequency $f_s$ is generated, as is a timing signal whose frequency is $3f_s$.

These timing signals are supplied to memory load control circuit 1511 and to memory unload circuit 1513 which operate to load memory 1519 with digitized line intervals of the separated R, G and B components of the television signal, and also to unload the memory so as to adjust the vertical period thereof in accordance with the present invention, and to descramble the incoming television signal.

A vertical interval detector 1518 detects the presence of the vertical blanking interval in each field of incoming television signal; and this detector may be located either upstream or downstream of the NTSC-to-RBG decoder. In any event, the vertical interval detector serves to strip the vertical blanking interval from the incoming television signal and supply it to VBI data detector 1509. The VBI data detector receives timing pulses from timing generator 1507 for the purpose of separating from the incoming vertical blanking interval the encrypted fingerprint, profile and scramble map data. This separated VBI data is supplied to a central processing unit (CPU) 1515, together with a suitable DES decryption key. It is recognized that, of course, the purpose of the DES decryption key is to permit the proper decoding of the encrypted VBI data.

CPU 1515 also is coupled to memory load control circuit 1511 and to memory unload control circuit 1513 to select the particular field memory included in memory 1519 for loading, to select the particular field memory for unloading, to descramble the incoming line intervals so as to restore the proper order thereto, and to control the manner in which television data is read out from the selected field memory. It is this latter feature which results in a modification of the television signal by adjusting the vertical period thereof. Thus, CPU 1515 controls memory unload control circuit 1513 so as to determine the read-out rate for each line interval read from memory 1519. In the other embodiment described herein, CPU 1515 controls memory unload control circuit 1513 so as to determine the read-out time of line intervals read from memory 1519 and the number of black line intervals to be added to the active lines read from the memory, as described above. By changing the read-out rate of memory 1519, the duration of the line intervals read therefrom likewise is changed. Also, by changing the number of line intervals included in each field, the duration of each field and, thus, the duration of each frame may be adjusted.

Of course, the particular read-out rate used to unload memory 1519, or the number of inactive lines to be included in a field, is determined by the profile data included in the vertical blanking interval of the incoming television signal. The manner in which CPU 1515 operates to control the vertical period in accordance with the selected profile pattern has been discussed in detail hereinabove and need not be repeated here.

The separated R, G and B video components are digitized by separate R, G and B A/D converters 1517. Thus, and in the manner discussed above, each A/D converter produces a line interval of pixels, each pixel having a value representing the chrominance level of that component. A/D converters 1517 supply the R, G and B digitized line intervals to separate R, G and B field memory devices 1519. It is preferred that each field memory device be comprised of eight separate field memories, four field memories to accommodate four odd fields and four field memories to accommodate four even fields. Memory 1519 thus may be formed of twenty-four separate memory units, eight memory units for each of the R, G and B components, with each set of eight memory units being adapted to accommodate four frames, each frame being formed of two interlaced odd and even field intervals.

The scramble map received in a vertical blanking interval is decrypted, and each such scramble map represents the scrambled order of the line intervals included in the next-following field. Consistent with the example described above, the first block of line intervals is stored in rows 141–148, and these rows are read out from memory 1519, line-by-line, first. Then, rows 186–335 are read out, line-by-line, constituting the second block of line intervals. Following row 335, rows 95–140 are read from the memory 1519, and it is recalled that these rows constitute the third block of line intervals. Finally, rows 149–185 of memory 1519 are read out, and these rows comprise the fourth block of line intervals. Thus, notwithstanding the receipt of a scrambled field interval, the scramble map recovered from the vertical blanking interval and stored in CPU 1515 serves to descramble the vertical field intervals, thereby recovering the video signal in proper order.

As each line interval of pixels is read from a field memory included in memory 1519, the pixels are converted into analog form by D/A converter 1521. In the preferred embodiment wherein separate R, G and B memory devices are used as memory 1519, D/A converter 1521 likewise is formed of separate R, G and B, D/A converters. Thus, each chrominance component is recovered in analog form, and these recovered analog signals, having their vertical periods modified in accordance with the present invention, are supplied to RGB-to-NTSC encoder 1525 for combining the R, G and B components into an NTSC color video signal.

The output of the RGB-to-NTSC encoder is supplied to a cable distribution head end unit 1527 for mixing with the usual horizontal synchronizing pulses, vertical blanking pulses and color subcarrier bursts.

As a result, a conventional NTSC composite television signal, having the usual synchronizing and color bursts added thereto, but having modified vertical periods is supplied to the cable network.

Figure 16:
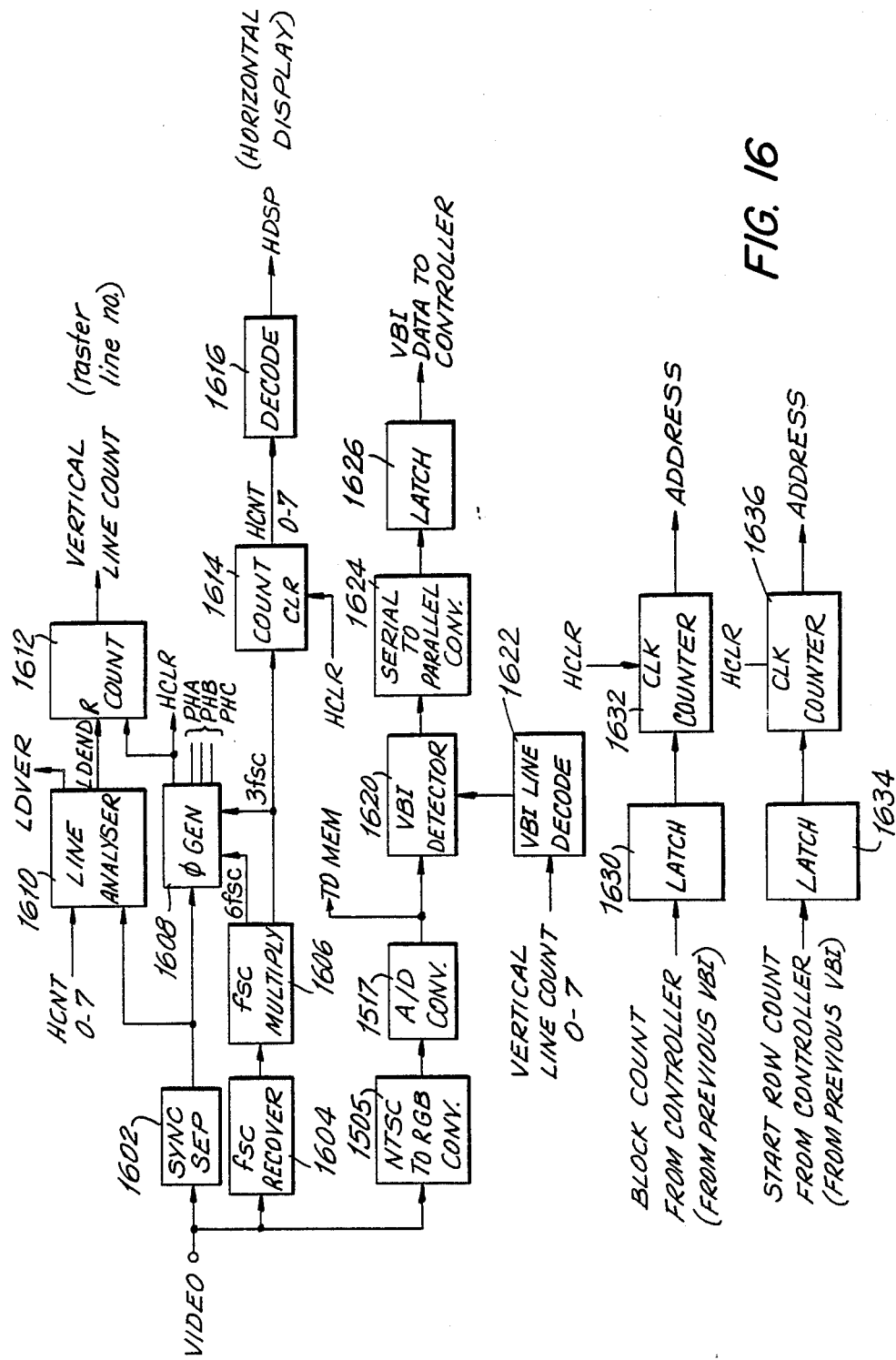
FIG. 16 is a block diagram showing in greater detail yet another portion of the system shown in FIG. 9.

FIG. 16 illustrates in somewhat greater detail the manner in which timing generator 1507 and memory load control circuit 1511 operate to load memory 1519 with received, scrambled video signals. As before, the incoming video signal is supplied to NTSC-to-RGB decoder 1505 which, in turn, supplies separated R, G and B video components to A/D converters 1517. It is recalled from FIG. 15 that the A/D converters supply memory 1519 with digitized line intervals for each of the R, G and B components.

The incoming video signal also is supplied to a synchronizing signal separator 1602 which separates from the incoming video signal the horizontal synchronizing pulses. A color subcarrier recovery circuit 1604 also is supplied with the incoming video signal and recovers therefrom the usual color subcarrier of frequency $f_s$. A frequency multiplier 1606 multiplies the recovered color subcarrier by factors of 3 and 6, respectively, thereby producing timing signals of frequencies $3f_s$ and $6f_s$, respectively. These timing signals, together with the separated horizontal synchronizing pulses, are supplied to a phase generator 1608 which, in turn, generates the HCLR pulses (such as discussed above with respect to FIG. 7B) together with three phased timing signals identified as PHA, PHB and PHC, respectively, the frequency of each of these timing signals being equal to $3f_s$, but these signals exhibiting relative phase shifts of 120° with respect to each other. The HCLR signal, which coincides approximately with the recovered horizontal synchronizing pulses, is counted by a counter 1612, the count of which represents the vertical line count. Thus, the count of counter 1612 indicates the raster line number then being received by the illustrated apparatus.

The recovered horizontal synchronizing signals also are supplied to a line analyzer 1610 together with a horizontal count signal the latter being represented as an 8-bit digital signal. This HCNT signal represents the present horizontal position of the line interval included in the video signal then being received. Line analyzer 1610 generates a LDEND signal which occurs generally at the first equalizing pulse included in a vertical field. Thus, the LDEND signal may be used to indicate the start of a field interval and serves to reset counter 1612, thus resetting the vertical line count at the beginning of the line intervals commencing in the vertical blanking interval. Counter 1612 thus accurately tracks the line intervals as they are received.

The HCNT signal produced by counter 1614 is supplied to a decoder 1616 which utilizes the HCNT signal to produce a horizontal display signal HDSP. This HDSP signal is similar to that shown in FIG. 7C, and represents that portion of each line interval wherein active video information is present. It will be recognized that this HDSP signal is used to control memory 1519 so as to effectively "open" the memory to receive digitized line interval information only during the active portion of that interval.

VBI detector 1620 is coupled to A/D converter 1517 and is adapted to detect and pass the VBI data to serial-to-parallel converter 1624. The VBI detector is enabled by VBI line decoder 1622 which, in turn, responds to the vertical line count generated by counter 1612. Thus, during those line intervals in which VBI data has been inserted, for example, during the selected line intervals between lines 10 and 20 of a field interval, decoder 1622 enables VBI detector 1620 to pass the VBI data which is present in those line intervals. As a result, fingerprint location, profile and scramble map data are converted from serial form (i. e. the form in which they are present in the vertical blanking interval) to parallel form, and this data then is stored in latch circuit 1626 to be supplied thereafter to CPU 1515. If desired, the latch circuit may include separate stages, each stage storing a respective one of the fingerprint location data, the profile data and the scramble map. As determined by CPU 1515, this data may be transferred thereto as called for by the CPU.

As mentioned above, the scramble map data present in a vertical blanking interval represents the scramble map for the next-following field interval. Of course, this scramble map data is transferred to CPU 1515 by latch circuit 1626, and then, prior to the receipt of the next-following field interval, the CPU supplies latch circuit 1630 with a count representing the number of lines included in the first block of scrambled video data that will be received in the next-following field interval. At the same time, the CPU supplies to latch circuit 1634 a count representing the address of the first row in memory 1519 in which the first line interval of the first block of scrambled video data is to be stored, or loaded. Thus, the starting row in which the first block of scrambled video information is to be stored, as well as the size of that block are loaded into latch circuits 1634 and 1630, respectively. The counts stored in these latch circuits then preset counters which, in turn, supply addresses to memory 1519 to address the proper rows therein into which the received and digitized line intervals are loaded. As shown, counter 1632 is coupled to latch circuit 1630 and counter 1636 is coupled to latch circuit 1634. Both of these counters count the HCLR pulses generated by phase generator 1608 so as to provide current, updated addresses for the memory.

In one embodiment, counter 1632 is decremented such that the instantaneous count thereof indicates the number of line intervals remaining in the block of scrambled line intervals being received. Preferably, counter 1636 is incremented so as to address successive rows in memory 1519 into which each received line of digitized video information is stored. In the numerical example discussed above, the video information is received in the following order: block 3, consisting of 45 line intervals, followed by block 1, consisting of 8 line intervals, followed by block 4 consisting of 37 line intervals, followed by block 2 consisting of 150 line intervals. CPU 1515 utilizes the scramble map supplied thereto by latch circuit 1626 such that, when block 3 is received, counter 1632 is preset to a count of 45 and counter 1636 is preset to a count of, for example, 178. When counter 1632 is decremented to a count of 0, counter 1636 will be incremented to a count of 222. Then, counter 1632 is preset to a count of 8 and counter 1636 is preset to a count of 20. Block 1 next is received, and this block is stored in rows 20–27, respectively, of memory 1519. When all rows of this block is received, counter 1632 will have been decremented to a count of 0, whereafter this counter is preset to a count of 37 and counter 1636 is preset to a count of 223. Block 4 next is received and is stored at rows 223–259, respectively, in memory 1519. When the last row of this block is received, counter 1632 will have been decremented to a count of 0, and the CPU then presets counter 1632, via latch circuit 1630, to a count of 150. At this time, counter 1636 is preset to a count of 28; and block 2 is stored, line-by-line, at rows 28–177, respectively, in memory 1519. Thus, the scrambled video information is descrambled and stored, in order, at the proper row addresses of memory 1519. The contents of this memory then may be read out in the manner discussed above so as to change the vertical period of each field interval, in accordance with the present invention.

Figure 17:
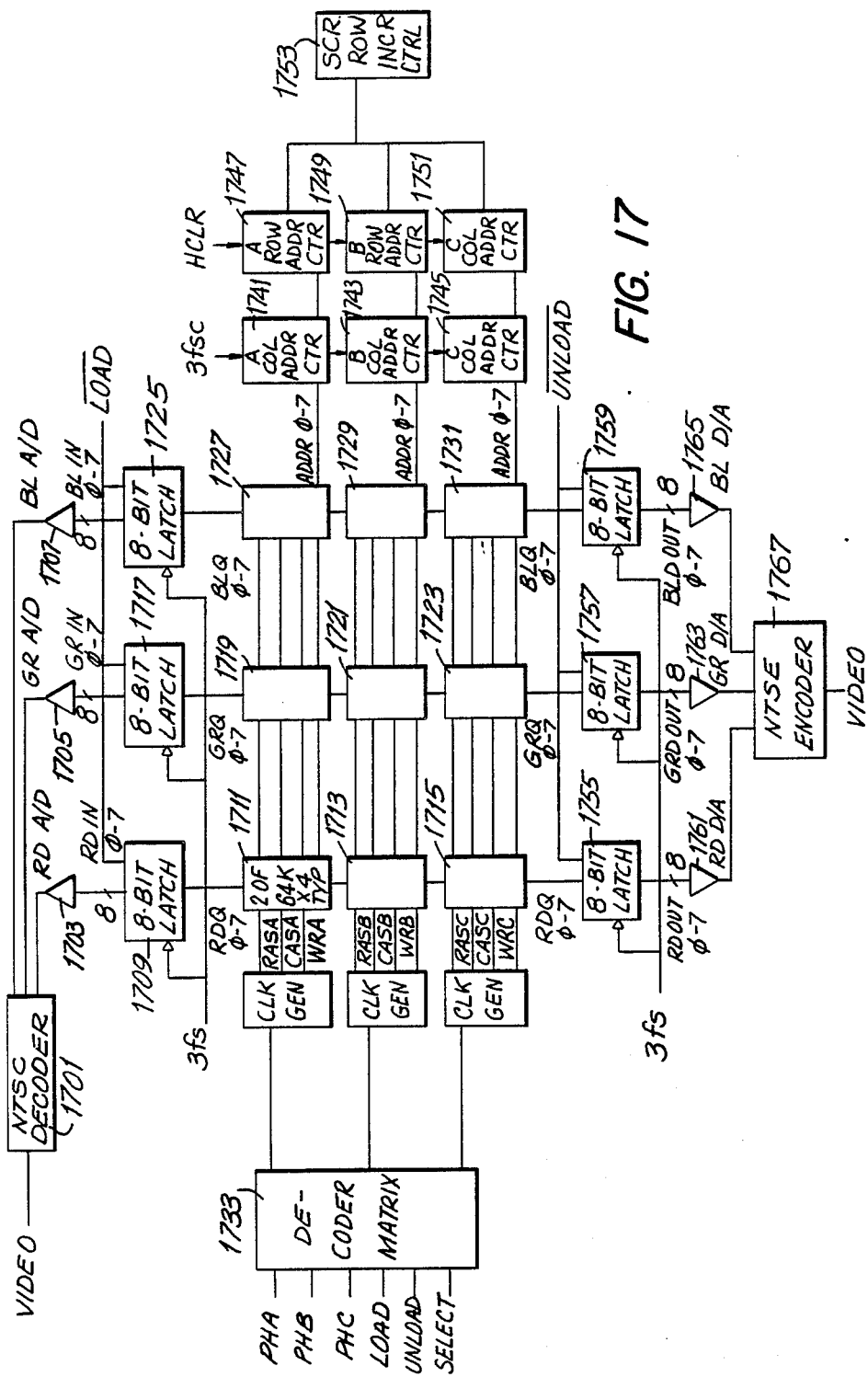
FIG. 17 is a block diagram showing in greater detail the manner in which video signals are written into and read from a memory to provide both descrambling and vertical period adjustment.

In one embodiment of this invention, memory 1519 is comprised of dynamic random access memories (DRAM) which, as is known to those of ordinary skill in the art, are relatively inexpensive but operate at a relatively slow rate. Moreover, a DRAM must be refreshed periodically to accurately retain the digital information stored therein. In one embodiment, the operating cycle of a typical DRAM may be too slow to accommodate the sampling rate at which the A/D converters operate. For example, if the A/D converter samples the incoming R, G and B components at a rate equal to the color subcarrier frequency $f_s$, or at a rate equal to 3 times this frequency, the operating speed of a typical DRAM may not be sufficient to accommodate this sampling rate. It is for this purpose that phase generator 1608 (FIG. 16) generates the three phased timing pulses PHA, PHB and PHC, respectively One embodiment of one field memory using such a DRAM, but timed to load and unload R, G and B components, respectively, is illustrated in FIG. 17. This embodiment represents a compromise, whereby the operations of the DRAM are divided into three phases so that the speed limitations of the individual DRAM devices are overcome by phase overlapping. The illustrated one field of memory actually is comprised of nine DRAM devices, one for each phase and one for each of the R, G and B color components.

The illustrated DRAM devices 1711–1731 are known as "single port" devices wherein the same terminal, or pin, functions both as an input and an output. Memory devices 1711, 1713 and 1715 are used to store one field of the red component, memory devices 1719, 1721 and 1723 are used to store one field of the green component, and memory devices 1727, 1729 and 1731 are used to store one field of the blue component. The R, G and B color components are derived from the incoming television signal by NTSC-to-RGB decoder 1701. Separate R, G and B A/D converters 1703, 1705 and 1707 digitize each line interval of the respective color components, and 8-bit pixel values are supplied to the R, G and B latch circuits 1709, 1717 and 1725, respectively. The timing signal $3f_s$ produced by multiplier 1606 (FIG. 16) is used to load successive pixels into their respective latch circuits.

Each memory device is addressed by a row and column address technique. Stated otherwise, each memory device may be thought of as having rows of storage locations for storing respective line intervals, and each storage location in a row may be addressed as a column address to store therein a pixel produced by A/D converter 1703 (or 1705 or 1707). In addition to addressing a row and column of the memory device, each memory device also is provided with a write enable input which, when supplied with a write control signal enables a pixel to be written into the location addressed by the row and column addresses. A clock generator 1735 generates row and column addresses, together with a write control signal, all supplied to memory device 1711. Similarly, clock generator 1737 generates row and column addresses and a write control signal for memory device 1713. Finally, clock generator 1739 generates row and column addresses together with a write control signal for memory device 1715. If memory devices 1711, 1713, and 1715 are thought of as phases A, B and C for the red field memory, clock generators 1735, 1737 and 1739 may be thought of as the phase A, phase B and phase C clock generators, respectively. These clock generators are driven by a decoder matrix 1733 which supplies the respective clock generators with timing pulses derived from the PHA, PHB and PHC signals produced by phase generator 1606 (FIG. 16), together with load and unload signals (which select the write and read memory functions, respectively) and a select signal (supplied by CPU 1515 (of FIG. 15) for selecting the particular field memory which is to be loaded and unloaded.

Column address counters 1741, 1743 and 1745 are supplied with timing pulses of a frequency $3f_s$ and are used to address successive columns in each addressed row of a corresponding phase of the memory devices. As a numerical example, about 680 columns are addressed successively for each row. It is recognized that column address counter 1741 addresses the columns of phase A memory device 1711 (as well as the columns of phase A memory device 1719 and phase A memory device 1727). Column address counter 1743 addresses the columns of phase B memory device 1713 (as well as the columns of phase B memory device 1721 and phase B memory device 1729). Finally, column address counter 1745 addresses the columns of phase C memory device 1715 (as well as the columns of phase C memory device 1723 and phase C memory device 1731).

Row address counters 1747, 1749 and 1751 are supplied with the HCLR signal and are used to address successive rows of the phase A, phase B and phase C memory devices, respectively. Thus, when a row is addressed in phase A memory device 1711 (or phase A memory device 1719 or phase A memory device 1727), 680 successive columns in that row are addressed by column address counter 1741. A similar cooperative relationship exists between row address counter 1749 and column address counter 1743, and between row address counter 1751 and column address counter 1745.

During a load operation, the select and load signals supplied to decoder matrix 1733 are used to select the field memory into which the digitized video signals are to be written, as determined by CPU 1515, and latch circuits 1709, 1717 and 1725 are enabled to supply to the selected field memory the 8-bit pixels stored in each latch circuit. The write control signal generated by clock generators 1735, 1737 and 1739 enable the pixels to be written into the selected field memory, and the column address signals generated by these clock generators serve to "clock" each pixel into the row and column location determined by the row and column address counters at the particular time established by the column address signal. Thus, at the phase A clock time, the pixels stored in latch circuits 1709, 1717 and 1725 are written into the addressed row and column location of phase A memory devices 1711, 1719 and 1727; at the phase B clock time, the pixels then stored in latch circuits 1709, 1717 and 1725 are written into the addressed row and column locations of phase B memory devices 1713, 1721 and 1729; and at the phase C clock time, the pixels stored in latch circuits 1709, 1717 and 1725 are written into the addressed row and column locations of phase C memory devices 1715, 1723 and 1731.

During an unload, or read operation, a similar operation is carried out, except that now the unload signal supplied to decoder matrix 1733 serves to enable readout latch circuits 1755, 1757 and 1759 to receive the pixels read from the addressed row and column locations of the phase A, phase B and phase C memory devices, at the phase A, phase B and phase C clock times determined by the column control signals generated by clock generators 1735, 1737 and 1739, respectively. The contents then stored in these read-out latch circuits are supplied to D/A converts 1761, 1763 and 1765, respectively, at an output timing rate equal to $3f_s$. From FIG. 17, it is seen that the converted analog R, G and B components are combined in NTSC encoder 1767 and supplied as a composite video signal whose vertical period is adjusted in accordance with the memory read-out timing that has been discussed above in conjunction with FIGS. 1 and 5.

Although not shown herein, the timing of the row and address control signals produced by each of clock generators 1735, 1737 and 1739 functions to permit the contents of each of the phase A, phase B and phase C memory devices to be refreshed periodically, to be loaded, and to be unloaded. Since a refresh operation occurs at times other than when a particular row of memory is loaded or unloaded, each row address counter includes a register to store temporarily the address of the particular row which is in the process of being refreshed. In one embodiment, the refresh operation serves to refresh 32 rows of a memory device during each horizontal blanking interval. Since active video information is not present during the horizontal blanking interval, this refresh operation does not interfere with the loading and unloading cycles of the field memories. It is appreciated, therefore, that eight horizontal blanking intervals are needed to refresh 256 rows of video information stored in each of the phase A, phase B and phase C memory devices.

While the present invention has been particularly shown and described with reference to preferred embodiments, it will be readily understood by those of ordinary skill in the art that various changes and modifications may be made without departing from the spirit and scope of the invention. This invention may be applied directly to television signals which are transmitted either by over-the-air broadcast techniques, by subscription techniques or by a cable distribution network. The use of this invention in conjunction with subscription television services, as when this invention is located at the head end of a cable distribution network, has been described. When used in a television subscription system, the vertical periods of the field intervals can be adjusted either at the head end location, as described herein, or at any other location upstream of the head end.

It is intended that the appended claims be interpreted as including those modifications and changes which have been discussed throughout this specification, as well as equivalents thereto.

What is claimed is:

1. A method of modifying a composite television signal to inhibit reproduction of an unauthorized recording thereof by conventional video recorders but enable the display of a video picture therefrom on a television receiver, comprising:
   increasing the time durations of horizontal line intervals included in a first predetermined number of frames of the television signal from a standard horizontal line duration to a pre-established maximum time duration and then decreasing said time durations from said pre-established maximum to said standard;
   decreasing the time durations of the horizontal line intervals included in a second predetermined number of frames of the television signal from said standard to a pre-established minimum time duration and then increasing said time durations from said pre-established minimum to said standard; and
   limiting the increase and decrease in the time durations of said horizontal line intervals such that the accumulated increase or decrease over a vertical interval is less than 200 nsec.

2. The method of claim 1 wherein said first predetermined number of frames is substantially equal to said second predetermined number of frames.

3. The method of claim 2 wherein the difference between said standard horizontal line duration and said pre-established maximum time duration is substantially equal to the difference between said standard horizontal line duration and said pre-established minimum time duration.

4. The method of claim 1 wherein said first predetermined number of frames is substantially different from said second predetermined number of frames.

5. The method of claim 4 wherein the integral of the increased time durations of the horizontal line intervals over said first predetermined number of frames is substantially equal to the integral of the decreased time durations of the horizontal line intervals over said second predetermined number of frames.

6. The method of claim 5, further comprising the step of selectively determining desired ones of said pre-established maximum and minimum time durations from a store of several pre-established time durations.

7. The method of claim 1, further comprising the step of detecting a change in the scene of the video picture represented by said television signal; and setting the time durations of the horizontal line intervals included in the frame in which said change in scene is detected substantially equal to said standard horizontal line duration.

8. The method of claim 7, further comprising the steps of selectively changing said pre-established maximum and minimum time durations and said first and second predetermined numbers of frames to inhibit different types of video recorders from reproducing said television signals for satisfactory video picture display.

9. The method of claim 1, further comprising the steps of encoding the modified television signal by a selected one of plural different encoding techniques; transmitting the encoded, modified television signal to authorized receiving stations; and selectively changing said pre-established maximum and/or minimum time durations to be within operating limits of the selected encoding technique.

10. The method of claim 1 wherein each step of increasing and decreasing the time durations of the horizontal line intervals comprises providing a digitized representation of said horizontal line intervals; storing said digitized representations in respective addresses of an addressable memory device; and reading out from said respective addresses the digitized representations at slower read-out rates to increase said time durations and at faster read-out rates to decrease said time durations, whereby said time durations exceed said standard horizontal line duration when said read-out rates are less than a predetermined standard rate and said time durations are less than said standard horizontal line duration when said read-out rates exceed said standard rate.

11. The method of claim 10 wherein the rate at which said digitized representations are read out from said respective addresses is controlled by profile data, said profile data determining the first and second predetermined numbers, the pre-established maximum and minimum time durations and the rates at which said read-out rate increases and decreases; and further comprising the step of selectively varying said profile data.

12. The method of claim 11 further comprising the step of geometrically correcting the digitized representations of said horizontal line intervals read out from said respective addresses, whereby the first digitized representation of the horizontal line interval which is read out from said addressable memory device corresponds to the top raster line interval in a displayed video picture notwithstanding the change in the duration of the read out horizontal line intervals from said standard horizontal line duration.

13. The method of claim 12 further comprising the steps of delaying the reading out of the first digitized representation of the horizontal line interval from said addressable memory device when the duration of that read out line interval is greater than standard and advancing the reading out of the first digitized representation of the horizontal line interval from said addressable memory device when the duration of that read out line interval is less than standard.

14. The method of claim 11 wherein said digitized representation of said horizontal line intervals comprises pixel values of respective pixels included in each horizontal line interval; and further comprising the steps of combining a portion of a pixel value of one horizontal line interval with a portion of an adjacent pixel value of the next horizontal line interval to produce a composite pixel value; and storing respective horizontal line intervals of composite pixel values.

15. The method of claim 14 wherein said step of combining comprises determining the percentages of the adjacent pixel values to be combined as a function of said profile data; and adding the determined percentages of adjacent pixel values to produce said composite pixel value.

16. The method of claim 15 wherein said step of determining the percentages of the adjacent pixel values to be combined comprises storing as a look up table data representing predetermined percentages of predetermined pixel values, addressing said look up table as a function of a pixel value read from said addressable memory device and said profile data, and reading from said look up table a percentage of the pixel value read from said addressable memory device.

17. The method of claim 16 wherein said step of addressing said look up table comprises generating a first portion of said address in response to said profile data and generating a second portion of said address in response to said pixel value read from said addressable memory device.

18. A method of modifying a composite television signal to inhibit the reproduction of an unauthorized recording thereof by conventional video recorders but enable the display of a video picture therefrom on a television receiver, comprising:
increasing above a standard number of horizontal line intervals normally included in a frame the number of horizontal line intervals included in a first predetermined number of frames of the television signal;
decreasing below said standard number the number of horizontal line intervals included in a second predetermined number of frames of the television signal;
the rate at which the numbers of horizontal line intervals are increased and decreased, the maximum and minimum numbers of horizontal line intervals in a frame to which said numbers of horizontal line intervals are increased and decreased, and the first and second predetermined numbers of frames containing the increased and decreased numbers of horizontal line intervals all corresponding to a profile pattern representing changes with respect to time in the number of horizontal line intervals in a frame and having a positive portion representing said first predetermined number of frames containing more than said standard number of horizontal line intervals in each frame and a negative portion representing said second predetermined number of frames containing less than said standard number of horizontal line intervals in each frame; and
selectively changing said profile pattern from among a plurality of profile patterns and correspondingly changing at least one of the following: (a) the rate at which the number of horizontal line intervals in a frame change; (b) the maximum number of horizontal line intervals included in a frame; (c) the minimum number of horizontal line intervals included in a frame; (d) the first predetermined number of frames containing more than said standard number of horizontal line intervals; and (e) the second predetermined number of frames containing less than said standard number of horizontal line intervals.

19. The method of claim 18, further comprising the steps of detecting a change in the scene of the video picture represented by said television signal, and having transitions between said positive and negative portions of said profile pattern pass through a level corresponding to said standard number of horizontal line intervals substantially at detected scene changes.

20. The method of claim 19, further comprising the steps of storing profile data representing different respective profile patterns, selecting stored profile data representing a profile pattern whose transitions through said level have a greater frequency of occurrence at detected scene changes, and controlling the increase and decrease in the number of horizontal line intervals in successive frames of the television signal in accordance with the selected profile data.

21. The method of claim 20 wherein at least one of said stored profile data represents a profile pattern which, when used to control the increase and decrease in the number of horizontal line intervals in successive frames of the television signal results in a television signal which if recorded and reproduced by a conventional VTR does not result in an acceptable viewable video picture; and further comprising the step of selecting during certain times the last-mentioned profile data.

22. The method of claim 20 further comprising the step of selectively adding an offset to the selected profile data to modify the profile pattern represented thereby so as to increase the respective maximum and minimum numbers of horizontal line intervals included in a frame.

23. The method of claim 20 further comprising the step of selectively adding an offset to the selected profile data to modify the profile pattern represented thereby so as to decrease the respective maximum and minimum numbers of horizontal line intervals included in a frame.

24. The method of claim 18 further comprising the steps of digitizing at least each horizontal line interval of active video information in each frame of the television signal; writing the digitized active video line intervals into respective storage locations of memory means; and subsequently reading from said memory means the digitized active video line intervals.

25. The method of claim 24 further comprising the steps of delaying the reading of the first active video line interval from said memory means when the profile pattern determines that the frame contains substantially more than said standard number of line intervals; and advancing the reading of the first active video line interval from said memory means when the profile pattern determines that the frame contains substantially less than said standard number of line intervals.

26. The method of claim 18 further comprising the steps of generating profile data representing a selected profile pattern; inserting said profile data into a predetermined portion of said television signal identifying the rate at which the number of horizontal line intervals are increased and decreased, the maximum and minimum numbers of horizontal line intervals in a frame, the number of frames included in the positive portion of the selected profile pattern and the number of frames included in the negative portion of the selected profile pattern; and transmitting the television signal having the profile data inserted therein to a remote location whereat said profile data is recovered and used to control the increase and decrease in the number of horizontal line intervals in successive frames of the television signal to be retransmitted from said remote location.

27. Apparatus for modifying a composite television signal to inhibit reproduction of an unauthorized recording thereof by conventional video recorders but enable the display of a video picture therefrom on a television receiver, comprising:
line duration increasing means for increasing the time durations of horizontal line intervals included in a first predetermined number of frames of the television signal from a standard horizontal line duration to a pre-established maximum time duration and then decreasing said time durations from said pre-established maximum to said standard;
line duration decreasing means for decreasing the time durations of the horizontal line intervals included in a second predetermined number of frames of the television signal from said standard to a pre-established minimum time duration and then increasing said time durations from said pre-established minimum to said standard; and
means for limiting the increase and decrease in the time durations of said horizontal line intervals such that the accumulated increase or decrease over a vertical interval is less than 200 nsec.

28. The apparatus of claim 27 wherein said first predetermined number of frames is substantially equal to said second predetermined number of frames.

29. The apparatus of claim 28 wherein the difference between said standard horizontal line duration and said pre-established maximum time duration is substantially equal to the difference between said standard horizontal line duration and said pre-established minimum time duration.

30. The apparatus of claim 27 wherein said first predetermined number of frames is substantially different from said second predetermined number of frames.

31. The method of claim 30 wherein the integral of the increased time durations of the horizontal line intervals over said first predetermined number of frames is substantially equal to the integral of the decreased time durations of the horizontal line intervals over said second predetermined number of frames.

32. The apparatus of claim 31 further comprising storage means for storing data representing several pre-established time durations; and means for reading data from said storage means for selectively determining desired ones of said pre-established maximum and minimum time durations.

33. The apparatus of claim 27, further comprising scene change detecting means for detecting a change in the scene of the video picture represented by said television signal; and means for setting the time durations of the horizontal line intervals included in the frame in which said change in scene is detected substantially equal to said standard horizontal line duration.

34. The apparatus of claim 33, further comprising adjustment means for selectively changing said pre-established maximum and minimum time durations and said first and second predetermined numbers of frames to inhibit different types of video recorders from reproducing said television signals for satisfactory video picture display.

35. The apparatus of claim 27, further comprising means for encoding the modified television signal by a selected one of plural different encoding techniques; means for transmitting the encoded, modified television signal to authorized receiving stations; and means for selectively changing said pre-established maximum and/or minimum time durations to be within operating limits of the selected encoding technique.

36. The apparatus of claim 27 wherein each of said line duration increasing and decreasing means comprises digitizing means for providing a digitized representation of said horizontal line intervals; memory means for storing said digitized representations in respective addresses thereof; and read-out means for reading out from said respective addresses the digitized representations at slower read-out rates to increase said time durations and at faster read-out rates to decrease said time durations, whereby said time durations exceed said standard horizontal line duration when said read-out rates are less than a predetermined standard rate and said time durations are less than said standard horizontal line duration when said read-out rates exceed said standard rate.

37. The apparatus of claim 36 further comprising profile supply means for supplying profile data to control the rate at which said digitized representations are read out from said respective addresses, said profile data determining the first and second predetermined numbers, the pre-established maximum and minimum time durations and the rates at which said read-out rate increases and decreases; said profile supply means including means for selectively varying said profile data.

38. The apparatus of claim 37 further comprising correction means for geometrically correcting the digitized representations of said horizontal line intervals read out from said respective addresses, whereby the first digitized representation of the horizontal line interval which is read out from said memory means corresponds to the top raster line interval in a displayed video picture notwithstanding the change in the duration of the read out horizontal line intervals from said standard horizontal line duration.

39. The apparatus of claim 38 wherein said correction means includes means for delaying the reading of the top raster line from said memory means when the duration of the line intervals being read are greater than standard, and means for advancing the reading of the top raster line from said memory means when the duration of the line intervals being read are less than standard.

40. The apparatus of claim 37 wherein said digitizing means includes means for generating pixels in each of the horizontal line intervals, said pixels having respective pixel values; and further comprising means for combining a portion of a pixel value of one horizontal line interval with a portion of an adjacent pixel value of the next horizontal line interval to produce a composite pixel value; and means for replacing the pixel values in a stored horizontal line interval with the composite pixel values.

41. The apparatus of claim 40 wherein said means for combining comprises means for determining the percentages of the adjacent pixel values to be combined as a function of said profile data, and means for adding the determined percentages of adjacent pixel values to produce said composite pixel value.

42. The apparatus of claim 41 wherein said means for determining the percentages of the adjacent pixel values to be combined comprises look up table means for storing data representing predetermined percentages of predetermined pixel values, table address means responsive to a pixel value read from said memory means and to said profile data for addressing said look up table means, and table read means for reading from said look up table a percentage of the pixel value read from said memory means.

43. The apparatus of claim 42 wherein said table address means generates a first address portion in response to said profile data and a second address portion in response to said pixel value read from said memory means.

44. Apparatus for modifying a composite television signal to inhibit the reproduction of an unauthorized recording thereof by conventional video recorders but enable the display of a video picture therefrom on a television receiver, comprising:
line interval increase means for increasing above a standard number of horizontal line intervals normally included in a frame the number of horizontal line intervals included in a first predetermined number of frames of the television signal;
line interval decrease means for decreasing below said standard number the number of horizontal line intervals included in a second predetermined number of frames of the television signal;
profile means for providing a profile pattern representing changes with respect to time in the number of horizontal line intervals in a frame, said profile pattern having a positive portion representing said first predetermined number of frames containing more than said standard number of horizontal line intervals in each frame and a negative portion representing said second predetermined number of frames containing less than said standard number of horizontal line intervals in each frame;
means for selectively changing said profile pattern from among a plurality of profile patterns; and
means for applying said profile pattern to said line interval increase and decrease means for changing at least one of the following: (a) the rate at which the number of horizontal line intervals in a frame change; (b) the maximum number of horizontal line intervals included in a frame; (c) the minimum number of horizontal line intervals included in a frame; (d) the first predetermined number of frames containing more than said standard number of horizontal line intervals; and (e) the second predetermined number of frames containing less than said standard number of horizontal line intervals.

45. The apparatus of claim 44, further comprising scene change detecting means for detecting a change in the scene of the video picture represented by said television signal; and wherein said profile means provides profile patterns having transitions between said positive and negative portions which pass through a level corresponding to said standard number of horizontal line intervals substantially at detected scene changes.

46. The apparatus of claim 45, wherein said profile means comprises profile storage means for storing profile data representing different respective profile patterns, and selecting means coupled to said profile storage means for selecting stored profile data representing a profile pattern whose transitions through said level have a greater frequency of occurrence at detected scene changes.

47. The apparatus of claim 46 wherein at least one of said stored profile data represents a profile pattern which, when used to control the increase and decrease in the number of horizontal line intervals in successive frames of the television signal results in a television signal which if recorded and reproduced by a conventional VTR, does not result in an acceptable viewable video picture; and wherein said selecting means includes means for selecting during certain times the last-mentioned profile data.

48. The apparatus of claim 46 wherein said profile means comprises offset means for selectively adding an offset to the profile data selected from said profile storage means to modify the profile pattern represented thereby so as to increase the respective maximum and minimum numbers of horizontal line intervals included in a frame.

49. The apparatus of claim 46 wherein said profile means comprises offset means for selectively adding an offset to the profile data selected from said profile storage means to modify the profile pattern represented thereby so as to decrease the respective maximum and minimum numbers of horizontal line intervals included in a frame.

50. The apparatus of claim 45 further comprising analog-to-digital converting means for digitizing at least each horizontal line interval of active video information in each frame of the television signal; memory means for storing the active video horizontal line intervals; write means for writing the digitized line intervals into respective storage locations of said memory means; and read means for reading from said memory means the digitized active video line intervals.

51. The apparatus of claim 50 further comprising means for delaying the reading of the first active video line interval from said memory means when the profile pattern represents a frame that contains substantially more than said standard number of line intervals; and means for advancing the reading of the first active video line interval from said memory means when the profile pattern represents a frame that contains substantially less than said standard number of line intervals.

52. The apparatus of claim 44 wherein said profile means includes selecting means for generating profile data representing a selected profile pattern; means for inserting said profile data into a predetermined portion of said television signal identifying the rate at which the number of horizontal line intervals are increased and decreased, the maximum and minimum numbers of horizontal line intervals in a frame, the number of frames included in the positive portion of the selected profile pattern and the number of frames included in the negative portion of the selected profile pattern; and means for transmitting the television signal having the profile data inserted thereinto to a remote location whereat said profile data is recovered and used to control the increase and decrease in the number of horizontal line intervals in successive frames of the television signal to be retransmitted from said remote location.

53. Apparatus for transmitting to subscribers a modified composite television signal which inhibits reproduction of an unauthorized recording thereof by conventional video recorders but enables the display of a video picture therefrom on a television receiver included in a subscription television distribution system, said apparatus comprising:

source means for providing television program signals to be transmitted via said subscription television distribution system;

fingerprint location means for identifying locations in the television program signals into which fingerprint data related to the television program may be inserted and for producing fingerprint location data indicative thereof;

profile data means for providing profile data of a profile pattern representing changes with respect to time of the vertical periods of the television program signals;

scramble means for rearranging the television program signals to produce scrambled television signals and for producing scramble map data indicative of the rearrangement of the television program signals;

means for inserting the fingerprint location data, the profile data and the scramble map data into predetermined portions of the rearranged television program signals;

means for supplying to said subscription television distribution system the rearranged television program signals having said fingerprint location data, profile data and scramble map data inserted therein; and vertical period adjustment means responsive to the supplied profile data for modifying the vertical periods of the television program signals prior to transmission of the television program signals to subscribers via said subscription television distribution system, said vertical period adjustment means including memory means for temporarily storing and reading out successive field intervals of the scrambled television signals so as to modify said vertical periods and for returning the rearranged scrambled television signals to descrambled form.

54. A method of modifying a composite television signal to inhibit the reproduction of an unauthorized recording thereof by conventional video recorders but enable the display of a video picture therefrom on a television receiver, comprising:

digitizing each horizontal line interval of active video information in each frame of the television signal;

writing a fixed number of the digitized active video line intervals into memory means and subsequently reading from said memory means the fixed number of digitized active video line intervals;

converting the digitized active video line intervals read from said memory means to analog form;

generating horizontal line intervals of nonactive video information; and adding a variable number of generated horizontal line intervals of nonactive video information to the analog active video line intervals read from said memory means, whereby the total number of line intervals included in a frame is selectively greater than or less than a standard number of horizontal line intervals normally included in a frame, depending upon the number of line intervals of nonactive video information added to the active video line intervals.

55. Apparatus for modifying a composite television signal to inhibit the reproduction of an unauthorized recording thereof by conventional video recorders but enable the display of a video picture therefrom on a television receiver, comprising:

means for deriving from said composite television signal a fixed number of horizontal line intervals of active video information in each frame of the television signal;

nonactive video line interval generating means for generating horizontal line intervals of nonactive video information;

combining means for combining the fixed number of active video line intervals with the nonactive video line intervals to produce an output frame; and means for varying the number of nonactive video line intervals which are combined with the fixed number of active video line intervals such that the total number of line intervals included in an output frame is selectively greater than or less than a standard number of horizontal line intervals normally included in a frame, depending upon the number of nonactive video line intervals which are combined.

56. A method of modifying a composite television signal to inhibit the reproduction of an unauthorized recording thereof by conventional video recorders but enable the display of a video picture therefrom on a television receiver, comprising:

increasing above a standard number of horizontal line intervals normally included in a frame the number of horizontal line intervals included in a first predetermined number of frames of the television signal;

decreasing below said standard number the number of horizontal line intervals included in a second predetermined number of frames of the television signal;

the rate at which the numbers of horizontal line intervals are increased and decreased, the maximum and minimum numbers of horizontal line intervals in a frame to which said numbers of horizontal line intervals are increased and decreased, and the first and second predetermined numbers of frames containing the increased and decreased numbers of horizontal line intervals all corresponding to a profile pattern representing changes with respect to time in the number of horizontal line intervals in a frame and having a positive portion representing said first predetermined number of frames containing more than said standard number of horizontal line intervals in each frame and a negative portion representing said second predetermined number of frames containing less than said standard number of horizontal line intervals in each frame;

selectively changing said profile pattern and correspondingly changing at least one of the following: (a) the rate at which the number of horizontal line intervals in a frame change; (b) the maximum number of horizontal line intervals included in a frame; (c) the minimum number of horizontal line intervals included in a frame; (d) the first predetermined number of frames containing more than said standard number of horizontal line intervals; and (e) the second predetermined number of frames containing less than said standard number of horizontal line intervals; and compensating for vertical shift otherwise present in a video picture displayed from the modified television signal caused by said increasing and decreasing of the number of horizontal line intervals in said frames.

57. Apparatus for modifying a composite television signal to inhibit the reproduction of an unauthorized recording thereof by conventional video recorders but enable the display of a video picture therefrom on a television receiver, comprising:

line interval increase means for increasing above a standard number of horizontal line intervals normally included in a frame the number of horizontal line intervals included in a first predetermined number of frames of the television signal;

line interval decrease means for decreasing below said standard number the number of horizontal line intervals included in a second predetermined number of frames of the television signal;

profile means for providing a profile pattern representing changes with respect to time in the number of horizontal line intervals in a frame, said profile pattern having a positive portion representing said first predetermined number of frames containing more than said standard number of horizontal line intervals in each frame and a negative portion representing said second predetermined number of frames containing less than said standard number of horizontal line intervals in each frame;

means for selectively changing said profile pattern;

means for applying said profile pattern to said line interval increase and decrease means for changing at least one of the following: (a) the rate at which the number of horizontal line intervals in a frame change; (b) the maximum number of horizontal line intervals included in a frame; (c) the minimum number of horizontal line intervals included in a frame; (d) the first predetermined number of frames containing more than said standard number of horizontal line intervals; and (e) the second predetermined number of frames containing less than said standard number of horizontal line intervals; and means for compensating for vertical shift otherwise present in a video picture displayed from the modified television signal caused by said increasing and decreasing of the number of horizontal line intervals in said frames.

* * * * *